United States Patent [19]
Barnard et al.

[11] Patent Number: 5,586,252
[45] Date of Patent: Dec. 17, 1996

[54] SYSTEM FOR FAILURE MODE AND EFFECTS ANALYSIS

[75] Inventors: Raymond F. Barnard, Endicott, N.Y.; Stephen L. Dohanich, North Potomac, Md.; Philip D. Heinlein, Binghamton, N.Y.

[73] Assignee: International Business Machines Corporation, Armonk, N.Y.

[21] Appl. No.: 247,953

[22] Filed: May 24, 1994

[51] Int. Cl.$^6$ .................................................. G06F 11/34
[52] U.S. Cl. ..................... 395/185.01; 395/600; 371/36
[58] Field of Search .................................. 395/575, 500, 395/600, 650, 800, 183.22, 184.01, 185.01, 185.02; 371/15.1, 7, 16.1, 19, 36; 364/232.3, 264.3, 285

[56] References Cited

U.S. PATENT DOCUMENTS

| | | | |
|---|---|---|---|
| 3,571,802 | 3/1971 | Serra | 395/101 |
| 4,251,858 | 2/1981 | Cambigue et al. | 364/102 |
| 4,408,291 | 10/1983 | Gunzberg et al. | 364/900 |
| 4,517,637 | 5/1985 | Cassell | 364/138 |
| 4,517,639 | 5/1985 | Ferrell et al. | 364/186 |
| 4,569,015 | 2/1986 | Dolev et al. | 364/200 |
| 4,570,261 | 2/1986 | Maher | 371/67 |
| 4,586,134 | 4/1986 | Norstedt | 364/200 |
| 4,723,242 | 2/1988 | Larson et al. | 371/68.1 |
| 4,751,635 | 6/1988 | Kret | 395/600 |
| 4,868,733 | 9/1989 | Fujisawa | 364/513 |
| 4,870,575 | 9/1989 | Rutenberg | 364/300 |
| 4,881,178 | 11/1989 | Holland et al. | 364/513 |
| 4,884,217 | 11/1989 | Skeirik et al. | 364/513 |

(List continued on next page.)

OTHER PUBLICATIONS

Knowledge Acquisition (1990) 2, pp. 129–144, "A methodlogy for knowledge acquisition in a group decision support system environment".

Organizational Decision Support Systems, pp. 287–304, "Group Decision Support Systems: Evolution And Status At The University Of Arizona".

(List continued on next page.)

Primary Examiner—Robert W. Beausoliel, Jr.
Assistant Examiner—Albert Décady
Attorney, Agent, or Firm—Michael E. Belk

[57] ABSTRACT

A team is selected to perform failure mode and effects analysis (FMEA) in a meeting moderated by a trained facilitator. A combination of group-ware, data bases, bridge programs and report generators configure RAM in a network of workstations in a meeting room to manage prompting members, recording responses, reaching consensus and documenting results. The members are prompted for and simultaneously enter failure modes for an apparatus or process into their respective workstations. The information is displayed anonymously to the other members. The correctness of input is verified by consensus including voting with automatic anonymous tallying, if required. A final list of failure modes is prepared, verified for correctness and completeness, and entered into the data base. For each failure mode a description of its effects and quantities for relative severity of occurrence, likelihood of occurrence, and likelihood of detection or mitigation are similarly generated, verified, and entered into the data base. Then the three quantities are automatically multiplied to determine a risk prioritization number (RPN). Bridge programs automatically generate an FMEA report in columnar form to document all the information in the data base. In order of RPN, in subsequent meetings, the causes of failure modes, current controls to prevent the effects or causes, proposed actions to further reduce the RPN, and the person responsible for implementing and reporting the results are generated, verified and entered into the data base. A second FMEA document with all this information is automatically generated and verified. Later in a group meeting, the actions which have been implemented and new quantities for relative severity of occurrence, likelihood of occurrence, and likelihood of detection or mitigation are similarly generated, verified and entered into the data base. A new RPN is automatically calculated and a third FMEA document is generated.

31 Claims, 24 Drawing Sheets

U.S. PATENT DOCUMENTS

| | | | |
|---|---|---|---|
| 4,914,657 | 2/1990 | Walter et al. | 371/11.3 |
| 4,967,381 | 10/1990 | Lane et al. | 364/551.01 |
| 4,972,415 | 11/1990 | Walter et al. | 364/734 |
| 4,975,905 | 12/1990 | Mann et al. | 370/85.1 |
| 5,008,853 | 4/1991 | Bly et al. | 364/518 |
| 5,010,478 | 4/1991 | Deran | 364/280.7 |
| 5,018,060 | 5/1991 | Gelb et al. | 364/970 |
| 5,036,518 | 7/1991 | Tseung | 371/32 |
| 5,067,099 | 11/1991 | McCown et al. | 364/550 |
| 5,084,878 | 1/1992 | Kanekawa et al. | 371/68.1 |
| 5,099,436 | 3/1992 | McCown et al. | 364/550 |
| 5,101,402 | 3/1992 | Chiu et al. | 371/17 |
| 5,109,380 | 4/1992 | Ogino | 371/15.1 |
| 5,119,489 | 6/1992 | Bond et al. | 395/575 |
| 5,121,470 | 6/1992 | Trautman | 395/140 |
| 5,125,091 | 6/1992 | Staas, Jr. et al. | 395/650 |
| 5,133,075 | 7/1992 | Risch | 395/800 |
| 5,146,591 | 9/1992 | Bachman et al. | 395/600 |
| 5,161,158 | 11/1992 | Chakravarty et al. | 371/15.1 |
| 5,179,643 | 1/1993 | Homma et al. | 395/140 |
| 5,269,014 | 12/1993 | Ogino | 395/500 |
| 5,295,231 | 3/1994 | Ogino | 395/77 |

OTHER PUBLICATIONS

Institute for the Future (IFTF), pp. 1217–1220, "Groupware And Collaborative Systems–A Big Picture".

Dept. of Management Inf. Systems, Univ. of Arizona, Apr. 1990, pp. 361–367, "The Organizational Implementation Of An Electronic Meeting System: An Analysis Of The Innovation Process", by George et al.

Proceedings of the Twenty–First Annual Hawaii Internatioal Conference On System Sciences, vol. III, pp. 247–254, "A Study Of Conflict In Group Design Activities: Implications For Computer–Supported Cooperative Work Environments", by Elam et al.

Proceedings of the Twenty–Third Annual Hawaii International Conference on System Sciences, vol. III, pp. 40–49, "Using A Group Decision Support System Envrionment For Knowledge Acquisition: A Field Study", by Liou et al.

Journal of Mgmt. Inf. Systems/Winter 89–90, vol. 6, No. 3, pp. 25–43, "Electronic Meeting System Experience at IBM", by Vogel et al.

Interfaces 20, Nov.–Dec., 1990, pp. 39–52, "IBM's Experiences with GroupSystems", by McGoff et al.

MIS Quarterley/Dec., 1990, pp. 369–384, "Implementing Electronic Meeting Systems at IBM: Lessons Learned and Success Factors", by Grohowski et al.

Journal of Information Science 14 (1988) pp. 347–354, "Issues in Group Decision Support System (GDSS) Design", by Lewis et al.

North–Holland Information & Management 18 (1990) pp. 15–28, "Group Decision Support System Impact: Multi–Methodological Exploration", by Vogel et al.

European Journal of Operational Research 46 (1990) pp. 143–161, "The effects of electronic meetings on group processes and outcomes: An assessment of the empirical research", by Pinsonneault et al.

North–Holland Information & Management 18 (1990) pp. 111–121, "Bringing Automated Support to Large Groups: The Burr–Brown Experience", by Dennis et al.

IBM Technical Report, "Integrated Business Process Modeling", pp. 1–39, by Dohanich et al.

( PARTICIPANT DISPLAY )

POTENTIAL FAILURE MODE AND EFFECTS ANALSIS

| PART NAME/ PART NUMBER | PROCESS FUNCTION | POTENTIAL FAILURE MODE | POTENTIAL EFFECT(S) OF FAILURE | V | POTENTIAL CAUSE(S) OF FAILURE | EXISTING CONDITIONS ||||
|---|---|---|---|---|---|---|---|---|---|
| | | | | | | CURRENT CONTROLS | OCC | SEV | DET | RPN |

SECTOR/ ENGINEER/ DATE/

FIG. 10(a)

POTENTIAL FAILURE MODE AND EFFECTS ANALSIS

| RECOMMENDED ACTION(S) & TARGET DATE | RESULTING | | | | | PERSON/ AREA RESPONSIBLE |
|---|---|---|---|---|---|---|
| | ACTION(S) TAKEN | OCC | SEV | DET | RPN | |
| | | | | | | | mm/dd/92

FIG. 10(b)

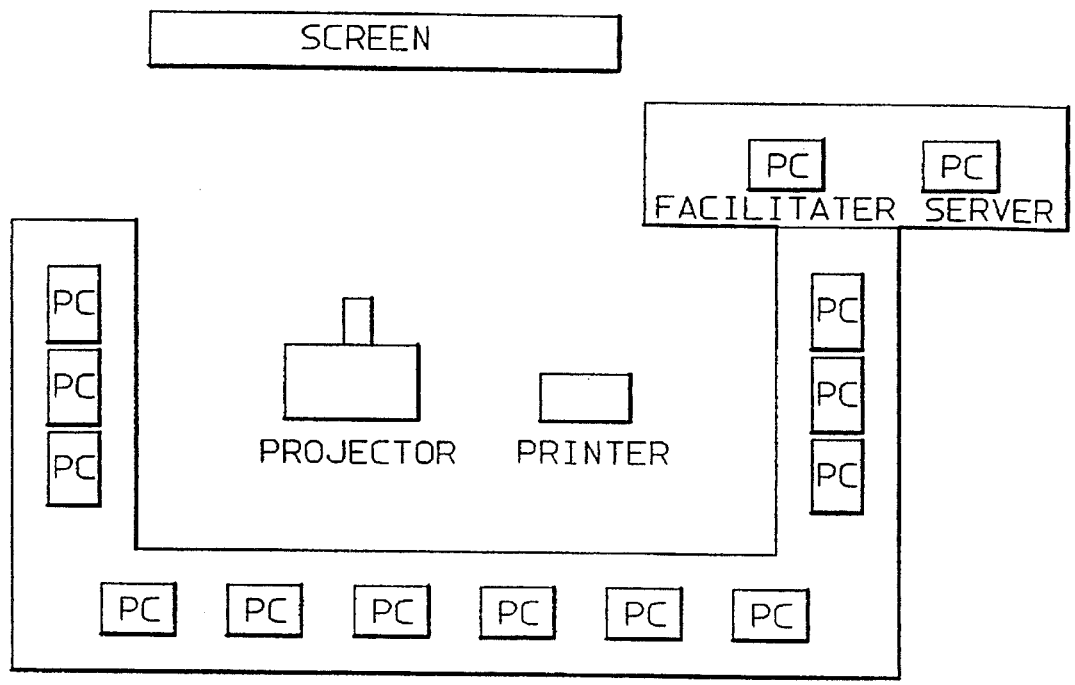
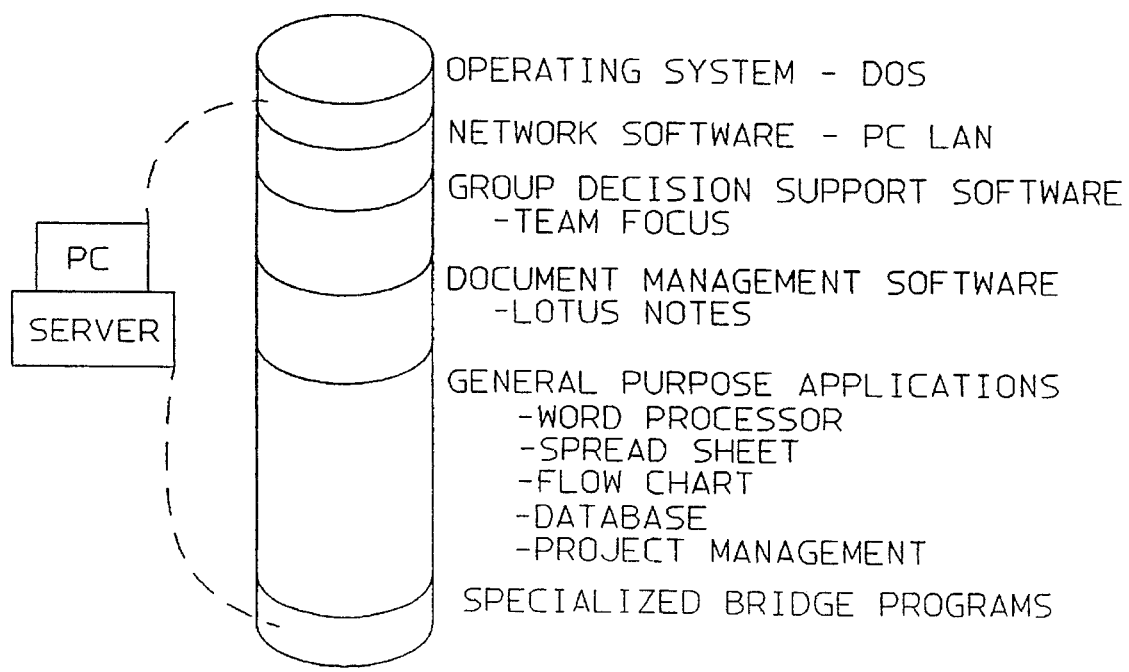
FIG. 14

EXPORT - EXPORT BRIDGE PROGRAM PSEUDO CODE
(EXPORTS TEAMFOCUS FILES TO DBASE III FILES).

(1) PROMPT USER FOR PATH TO SESSION INFORMATION FILE AND VERIFY THAT IT EXISTS.

(2) FILL A LIST BOX WITH EACH SESSION NAME AVAILABLE.

(3) SET DEFAULT SOURCE AND DESTINATION PATHS AS CURRENT DIRECTORY.

(4) VERIFY USER SELECTIONS.

(5) OPEN THE OUTPUT DATABASE FILE.

(6) READ THE FIRST RECORD FROM THE ITEM LIST FILE AND ASSIGN TO IDEA.

(7) AS LONG AS THERE ARE RECORDS IN THE INPUT FILE, DO THE FOLLLOWING:

(8) READ THE NEXT LINE AND ASSIGN VALUE TO COMMENT FILE VARIABLE.

(9) IF COMMENT FILE EXISTS THEN DO THE FOLLOWING:

(10) READ RECORD FROM COMMENT FILE.

(11) COMMENT=COMMENT FILE RECORD.

(12) AS LONG AS THERE ARE RECORDS, DO THE FOLLLOWING:

(13) READ RECORD FROM COMMENT FILE.

(14) APPEND CARRIAGE RETURN CHARACTER, LINE FEED CHARACTER, AND

(15) COMMENT FILE RECORD TO COMMENT.

(16) LOOP BACK TO STEP (12).

(17) WRITE RECORD TO DATABASE FILE.

(18) READ THE NEXT LINE FROM ITEM LIST FILE AND ASSIGN TO IDEA.

(19) LOOP BACK TO (7).

(20) EXIT TO PROGRAM.

APPLICATION DEVELOPMENT WORKSTATION

```
* FMEA BRIDGE PROGRAM PSEUDO CODE
  (PRODUCES FMEA DOCUMENT IN IBM BOOKMASTER)

INITIALIZE PROGRAM VARIABLES
       READ HEADLINER PARAMETER DATA
       READ DIRECTORY PATHS - SOURCE,
          DESTINATION, AND HISTORY
       READ PRINT CONTROL
       READ PRINTER NAME

VERIFY INPUT FILES EXIST
       CHECK SOURCE DIRECTORY FOR TEAMFOCUS
          IO FILES

BUILD DOCUMENT HEADER
       WRITE DOCUMENT TITLE (HEADER PARAMETERS)
       WRITE DATE

BUILD DOCUMENT BODY
       READ LIST_X.IO FILE
       FOR EACH LEVEL 1 ENTRY
          START NEW PAGE
          OPEN TABLE
          START TABLE ROW
          READ C_X-N.IO FILE FOR THAT
             LEVEL 1 ENTRY
             FIRST COLUMN
             WRITE POTENTIAL FAILURE MODE
               FROM COMMENT
             NEXT COLUMN
             WRITE POTENTIAL EFFECT OF FAILURE
               FROM COMMENT
             NEXT COLUMN
             WRITE POTENTIAL CAUSE OF FAILURE
               FROM COMMENT
             NEXT COLUMN
             WRITE CURRENT CONTROLS FROM COMMENT
             NEXT COLUMN
             WRITE OCCURRENCE RATING (EXISTING)
               FROM COMMENT
             NEXT COLUMN
             WRITE SEVERITY RATING (EXISTING)
               FROM COMMENT
```

FIG. 16(b)

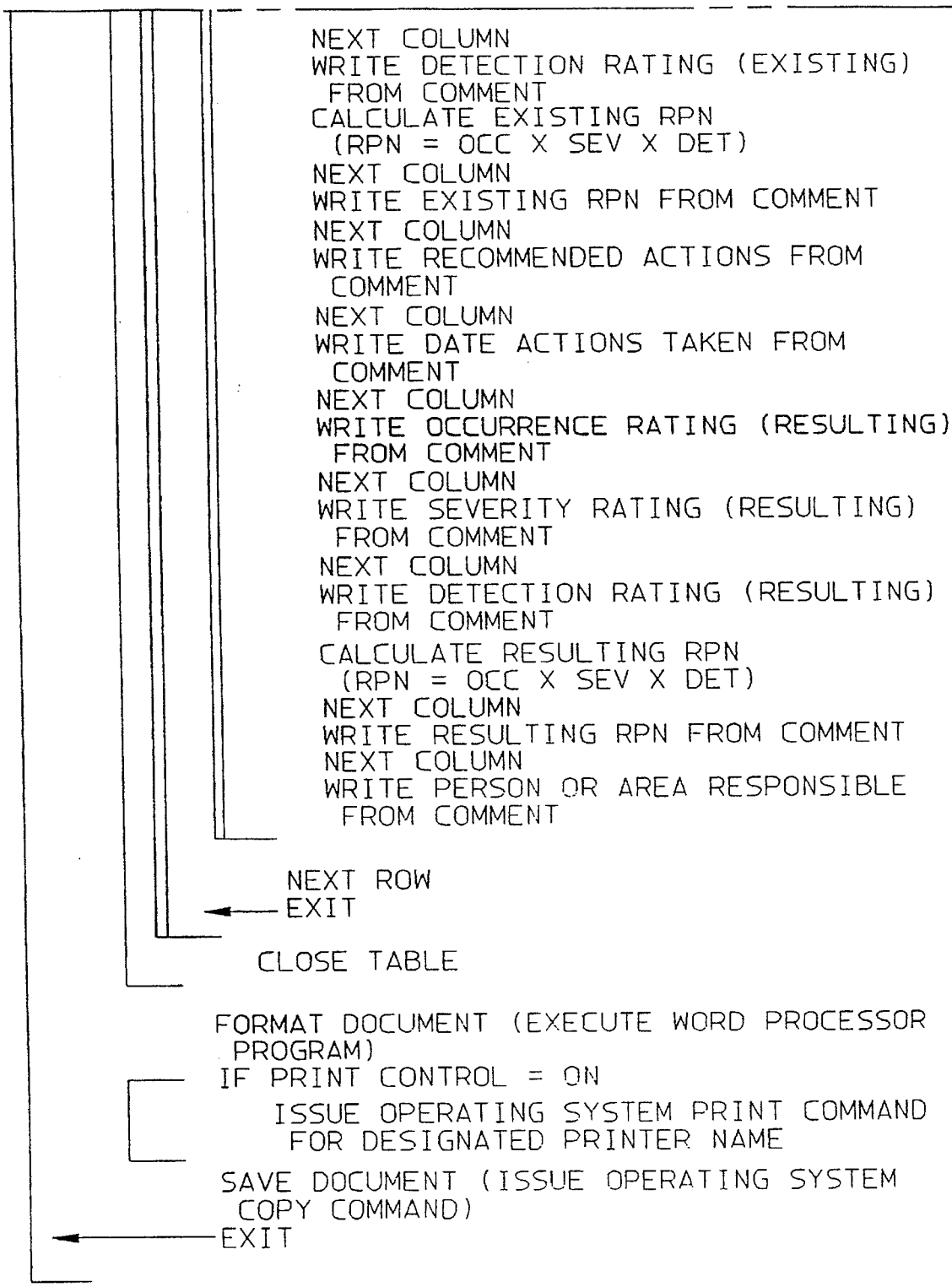

```
            NEXT COLUMN
            WRITE DETECTION RATING (EXISTING)
              FROM COMMENT
            CALCULATE EXISTING RPN
              (RPN = OCC X SEV X DET)
            NEXT COLUMN
            WRITE EXISTING RPN FROM COMMENT
            NEXT COLUMN
            WRITE RECOMMENDED ACTIONS FROM
              COMMENT
            NEXT COLUMN
            WRITE DATE ACTIONS TAKEN FROM
              COMMENT
            NEXT COLUMN
            WRITE OCCURRENCE RATING (RESULTING)
              FROM COMMENT
            NEXT COLUMN
            WRITE SEVERITY RATING (RESULTING)
              FROM COMMENT
            NEXT COLUMN
            WRITE DETECTION RATING (RESULTING)
              FROM COMMENT
            CALCULATE RESULTING RPN
              (RPN = OCC X SEV X DET)
            NEXT COLUMN
            WRITE RESULTING RPN FROM COMMENT
            NEXT COLUMN
            WRITE PERSON OR AREA RESPONSIBLE
              FROM COMMENT
         NEXT ROW
       ◄── EXIT
     CLOSE TABLE

FORMAT DOCUMENT (EXECUTE WORD PROCESSOR
    PROGRAM)
  IF PRINT CONTROL = ON
     ISSUE OPERATING SYSTEM PRINT COMMAND
       FOR DESIGNATED PRINTER NAME
  SAVE DOCUMENT (ISSUE OPERATING SYSTEM
    COPY COMMAND)
◄── EXIT
```

SYSTEM FOR FAILURE MODE AND EFFECTS ANALYSIS

FIELD OF INVENTION

This invention relates to computer systems for organizing meetings and for performing failure mode and effects analysis (FMEA). More specifically, this application relates to a network of workstations for FMEA and a method for using this network for performing FMEA.

BACKGROUND

FMEA (failure mode and effects analysis) is a methodology for determining the root causes of defects in manufacturing processes and products. FMEA can be applied during the design phase of a product or process to identify potential "failure modes" or defects which may cause product or process failure. FMEA may also be applied to existing defects of products or processes to determine the possible modes which could have caused the failures. The methodology emphasizes prevention by examining all potential causes of a defect, likelihood of these causes occurring and resulting in the defect and ways of preventing these causes from occurring and of resulting in the defect. The causes of defects in systems may be defects of components which may be caused by sub-component defects, etc. The risk of failure modes are prioritized based on frequency (i.e. probability) of occurrence, severity of the results, and likelihood (i.e. probability) of detection (and mitigation). The probability of certain defects may be estimated by applying statistics to product or process histories. Otherwise, probabilities have to be estimated based on experience. Usually probability of detection is either very high or very low.

Typically in product or process design, an individual or a team is assigned to perform the FMEA. In a series of meetings team members brainstorm to develop a list of potential defects, their effects, and potential causes of the defects and to prioritize the defects according to risk. One of more of the members must take notes during the session. The work is often divided up to be done outside (i.e. between the meeting). The outside work is then discussed and validated in the meetings. The group has to come to a consensus on whether each potential defect and the effects and causes of the defect is correct, and how much risk there is for each. Later after the meetings, the resulting information is gathered into an FMEA report or document.

U.S. Pat. No. 5,161,158 to Chakravarty discloses a failure analysis system to automatically simulate the effect of a failure of a replaceable unit in a complex electronic system. Such a system would be useful in FMEA for determining the severity of the effect of an identified, potential failure mode. Unfortunately a detailed simulation is not available for most systems.

U.S. Pat. 4,870,575 to Rutenberg discloses a system for combining hardware and software fault tree analysis (FTA). Failure mode and effect component analysis (FMECA) is discussed in column 6. FTA is formal process for determining the effect of single and simultaneous faults propagating through a complex system. FTA may be performed in combination with FMEA with identified failure modes being input into the FTA and results of the FTA being used as effects in the FMEA.

Group-ware refers to computer application programs that allow a group of people to work together in a computer network by sharing information. Group-ware products generally provide one or more of the following functions:

shared calendaring—view another's electronic calendar and possibly schedule meetings on another's calendar;

electronic mail—e.g. send messages to another's electronic mailbox even when the other person is not signed on;

shared word processing—e.g. multiple users read and edit the same documents possibly simultaneously;

shared data base management—e.g. multiple users read and even write records to the same data base.

group decision support—e.g. a group of users communicate anonymously about some question and automatically tally votes to reach consensus.

work flow support—e.g. manage work being done on a project by a group of people and the flow of information from task to task.

For example, LotusNotes® (from Lotus, Inc.) provides shared calendaring, word processing of shared files, and electronic mail in a computer network. TeamFocus® (from IBM corporation) provides group decision support in an electronic meeting environment.

Japanese patent JP 04-293157 describes a GroupWare application.

All the above citations are hereby incorporated by reference.

OBJECTS OF THE INVENTION

It is an object of this invention to reduce the elapse time from the beginning of FMEA until the completion of the analysis.

It is also an object to reduce the risk of mis-recording information shared in FMEA team meeting.

Another object of this invention is to encourage participation by team members in analysis meetings to reduce the risk that important information will not be shared.

Another object is to reduce the time (both elapsed and man-hours) needed to produce the FMEA document.

Finally, it is an object of the invention to reduce the time required (man hours) to perform FMEA.

SUMMARY OF THE INVENTION

The inventions of Applicants' include identification of problems with manual methods of failure mode and effects analysis (FMEA) and solutions to these problems which facilitate fast accurate analysis.

This invention includes a network of workstations with apparatus for organizing a group meeting specifically for performing FMEA analysis. Specific types of information is stored in a structure and other apparatus are provided for organizing the information for providing an FMEA report.

This invention provides a more efficient means of identifying failure modes, and the effects of failure modes, as well as for estimating frequencies of occupance, severity of effects, and likelihood of detection, which allow a risk prioritization number to be calculated.

Then failure modes are prioritized and studied preferably in priority order to determine the causes of the failure modes, current controls to prevent or mitigate these causes or their effects, and actions can be suggested for reducing the risk.

Later after implementation the actions can be studied to determine their effect on the risk prioritization number.

BRIEF DESCRIPTION OF THE DRAWINGS

These and other objects, features, and advantages of the inventions of applicants will be more fully understood with reference to the accompanying figures and following descriptions thereof:

FIGS. 3 through 9 is a flow diagram of the FMEA process of the invention;

FIG. 10 is a sample FMEA document.

FIG. 14 is a representation of the overall system configuration and the various applications available on the file server;

FIG. 15 is a pseudocode implementation of the TeamFocus Export bridge program

FIG. 16 is a pseudocode implementation of the FMEA bridge program

DETAILED DESCRIPTION OF THE DRAWINGS

Figure 1:
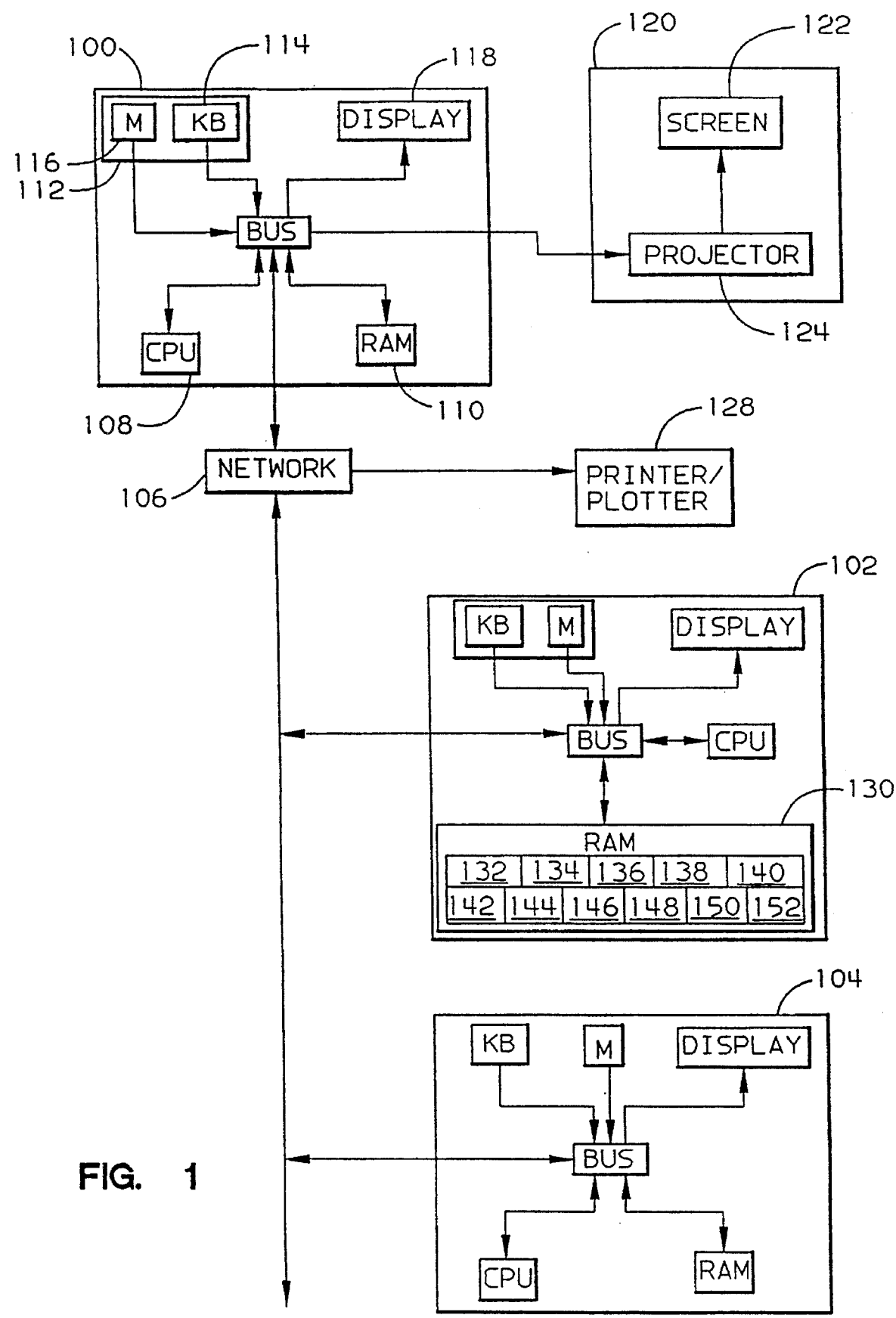
FIG. 1 is a block diagram showing a specific embodiment of the workstation network apparatus of the invention.

FIG. 1 shows a specific embodiment of the invention in which multiple workstations 100, 102, 104 connected together by a communications network system 106. Each workstation includes a central processor unit (CPU) 108, random access memory (RAM) 110 to store data and to control the CPU, computer input apparatus 112 for inputting information signals transmitted to the workstation, such as a keyboard 114, and also preferably a computer pointer 116 such as a computer mouse. Each workstation also includes computer controlled display apparatus including a local screen 118 controlled by signals transmitted by the workstation for displaying information at the workstation, such as a color LCD screen. Computer controlled group display apparatus 120 includes one or more screens each displaying at least about 2000 characters and which together are readable from each of the workstations. Preferably group display screen 120 includes projector 122 and screen 124. Each of these components are well known in the art, and can be procured from many suppliers.

Also connected to network 106 is tangible output apparatus 128 for producing tangible output depending on signals transmitted through the network. Preferably output apparatus 128 includes a printer for producing paper output and most preferably a dot addressable page printer such as a laser printer.

The network includes apparatus to perform required functions which could be discrete electronic components, or logic chips, or programmed array logic (PAL) chips, or ROM, but is preferably in the form of random access memory (RAM) 130 which is programmed by signals to control the CPU in a predetermined manner. The signals cause the RAM to enter states or to hold electrical charges which results in a specific structural embodiment. Those skilled in the art of computer programming will be able to use available tools such as compilers to create the necessary structures described herein. Although FIG. 1 shows the RAM containing the apparatus within workstation 102, those skilled in the art will understand that parts of the apparatus or copies of the apparatus are included in the RAM of other workstations and part may also be stored in the form of disk memory in a manner well known in the art.

The network further includes apparatus 132 which designates one of the workstations to which a group display is connected as a facilitator workstation, another one of the workstations as a file server, and a plurality and preferably all of the other workstations as member workstations. Apparatus 134 transmits prompts from the facilitator workstation to all the member workstation over the network depending on input into the input apparatus connected to the facilitator workstation and displays prompts on the group screen of the facilitator workstation. Apparatus 136 displays the transmitted prompts in a first window 202 (see FIG. 2) of the local screen 200 of one or more of the member workstations and provides for editing the prompts in the first window or moving the prompts to a second window 204 for editing. Apparatus 138 (see FIG. 1) displays in a second window 204 of local screen 200 text entered into the keyboard of the respective member workstations and provides for editing text in the second window.

Apparatus 140 allows selectively transmitting the edited input text and simultaneously displaying the transmitted text in third window 206 of the local screen at each of the member workstations and displaying the transmitted text on the group screen of the facilitator workstation. Preferably apparatus 140 allows the text to be selectively scrolled when the amount of text exceeds the capacity of the window so that all the text can be viewed. Apparatus 142 provides for voting to reach consensus regarding the validity and completeness of the transmitted textual and numeric information depending on input into the input means of the workstation, and automatically tabulating the votes and reporting the results on at least one of the computer controlled displays means for automatically calculating a risk or priority for a potential failure mode by automatically multiplying the estimated frequency of occurrence, times a number for the estimated severity, times the likelihood of detection. Apparatus 144 allows editing and storing to create a data base of information. Preferably apparatus 144 allows either textual or numeric information to be stored. Apparatus 146 identifies textual information entries in the data base as a potential failure mode type information; and Apparatus 148 identifies other information entries in the data base as other types of information, including: textural information as either, a description of a component or process step to which a potential failure mode applies, potential effect of a potential failure mode, potential cause of a potential failure mode, current control to prevent the causes or effects of a potential failure mode, or recommended action to reduce the risk of the potential failure mode; and numeric information as either an estimated frequency of occurrence of a potential failure mode, estimated severity of the effects of a potential failure mode, likelihood of detecting a failure mode, risk of a potential failure mode, estimated frequency of occurrence of a potential failure mode after taking the recommended action, estimated severity of the effects of a potential failure mode after taking the recommended action, likelihood of detecting a failure mode after taking the recommended action, risk of a potential failure mode after taking the recommended action. Apparatus 150 allows relating all the other entry types to a potential failure mode type entry in the data base so that the information can be organized according to failure mode. Finally, apparatus 152 provides for generating signals and transmitting signals to the means for printing, for generating a report in which potential failure mode type entries are listed in at least one column identified for potential failure modes and the other entries are listed in other columns each of the other columns for one type of other entries and in which the report indicates which potential failure mode entry each other type of entry is related to.

Figure 2:
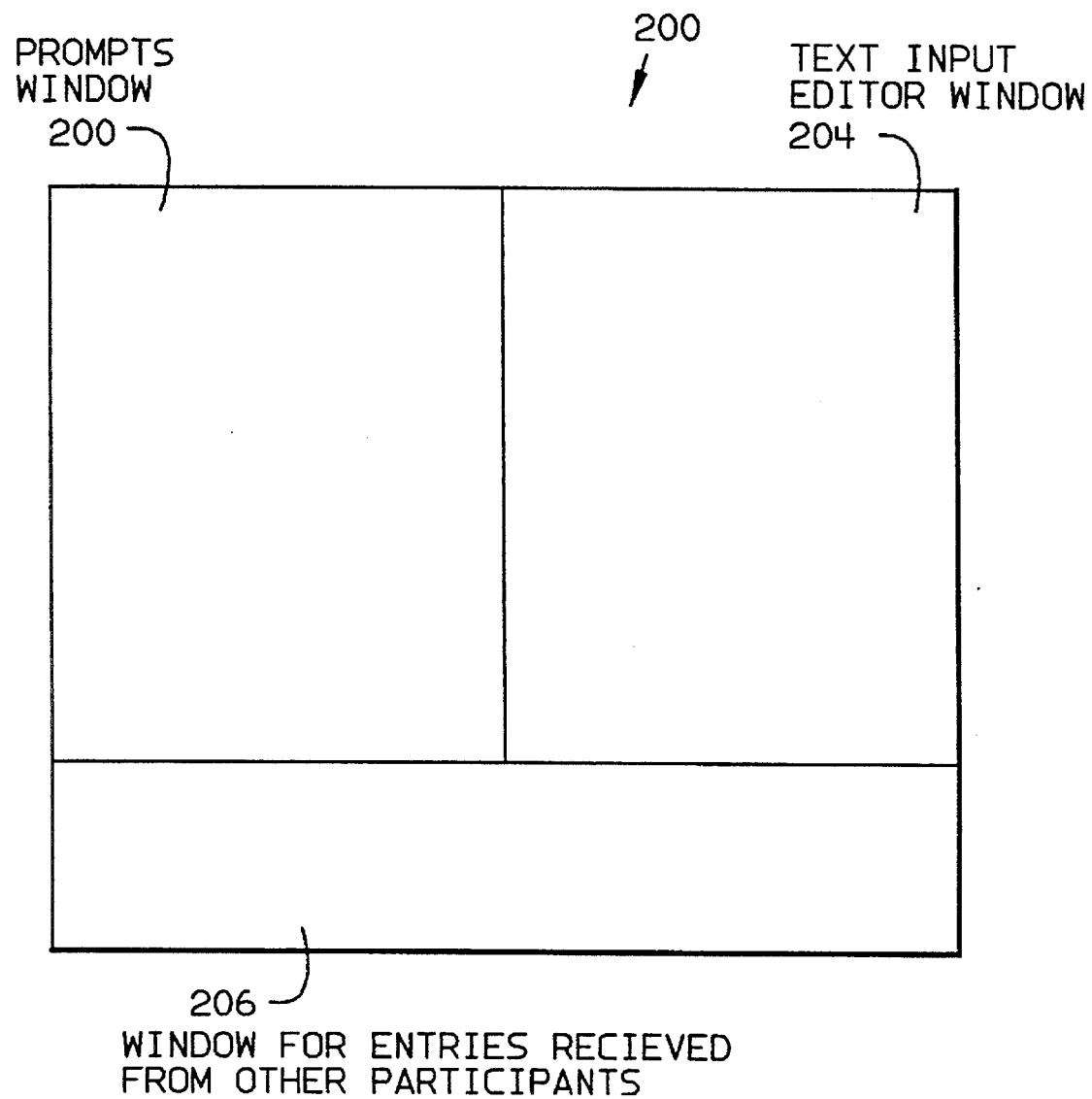
FIG. 2 is a schematic showing the a specific embodiment of the display at a member workstations.
Figure 3:
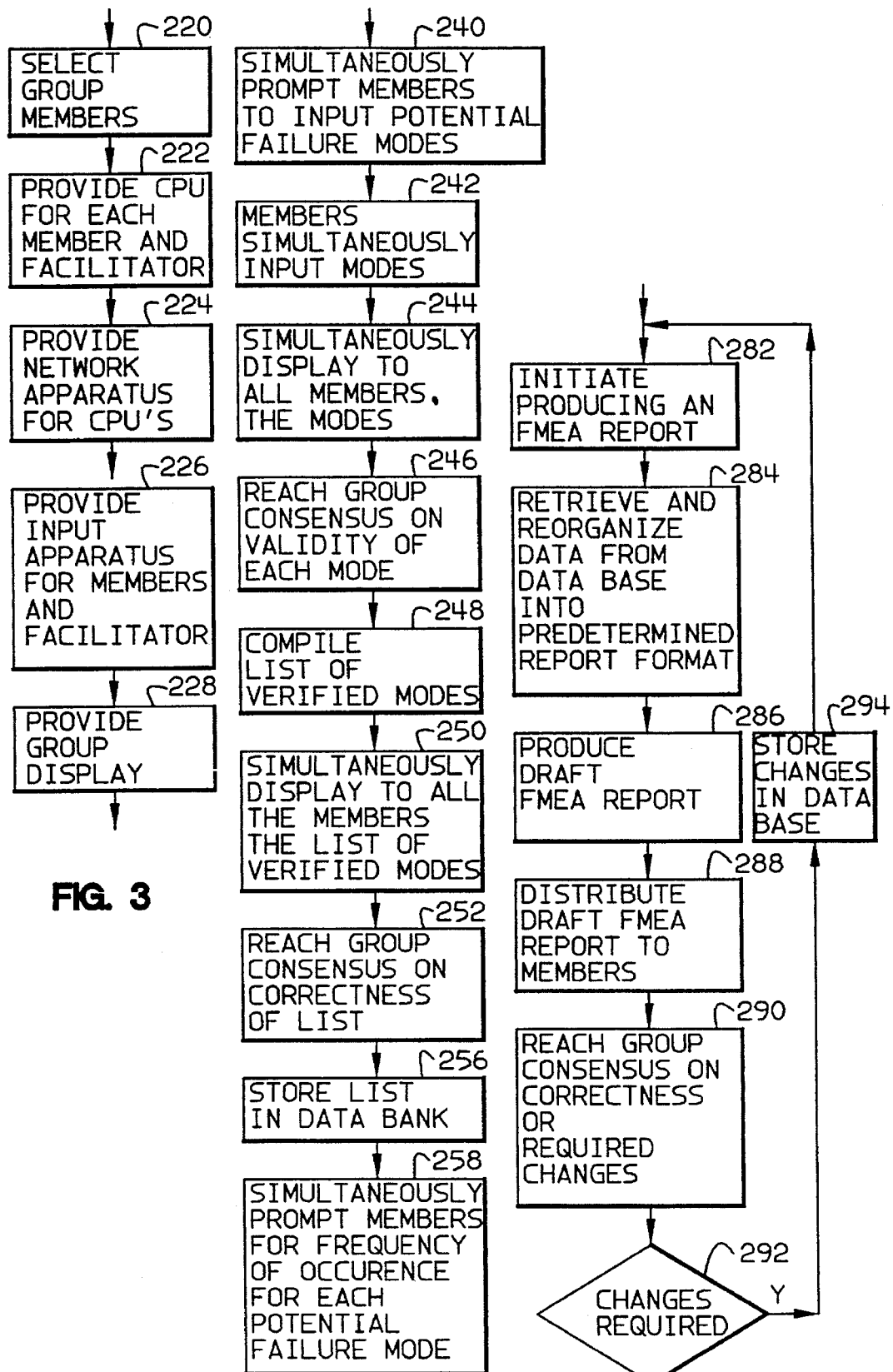
Figure 4:
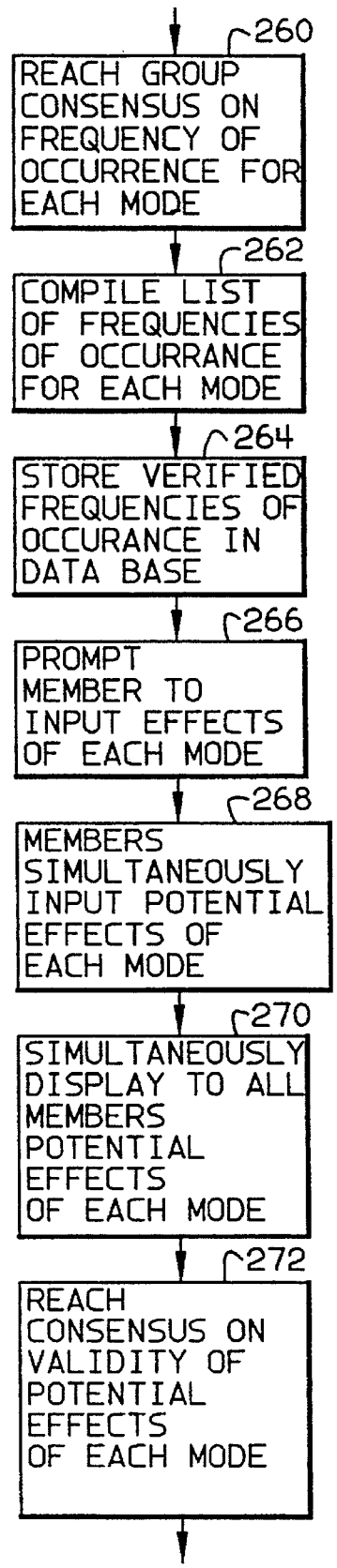
Figure 4C:
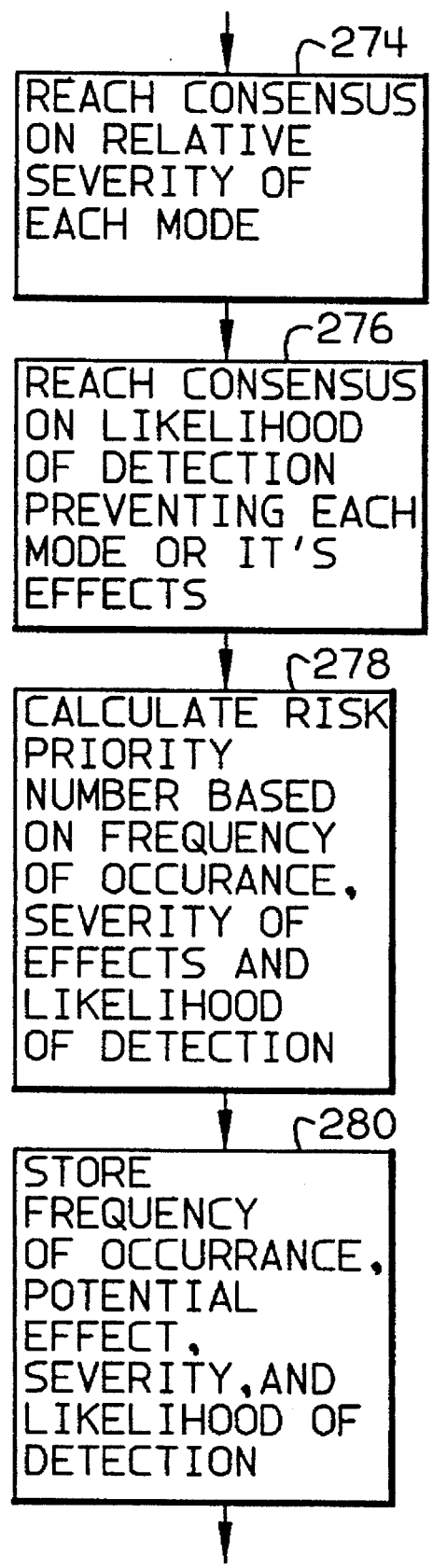

FIGS. 2 through 4 show a specific embodiment of the method of the invention. In 220 members who would work well together in a facilitated work meeting and have sufficient knowledge of the system to do the analysis are selected. In step 222 a CPU for each member of the group and a CPU for the facilitator are preferably provided in one room. Also preferably a CPU for a file server is provided most conveniently in the same room. In step 224, the CPUs are connected together by computer network such as a novel eithernet network (from Novell Company) or an IBM token ring. In step 226 input apparatus such as a keyboard and preferably also a mouse is connected to each workstation for inputting information into the CPUs from the respective member or facilitator and local display apparatus is connected to the CPU for outputting from the CPU to the respective member or facilitator for providing a workstation for the respective member or facilitator. In step 228 a group screen for outputting from the network at least 2000 characters simultaneously visible from each of the member workstations is connected to the network, preferably to the facilitator workstation.

In FIGS. 3 and 4, the next part of the process preferably occurs in a single defect identification and prioritization group meeting. In step 240, information is input into the facilitator workstation and transmitted to member workstations, and displayed on the local displays of the member workstations for prompting members of the group to input potential failure modes for an apparatus or process. In step 242 the members simultaneously input potential failure modes for the apparatus or process into a plurality of the member workstations. In step 244 the transmitted potential failure modes are displayed to the group and the facilitator. Preferably the potential failure modes are displayed anonymously to encourage participation, and preferably they are displayed on both the local displays at the workstations and on the group display. In step 246 group consensus for the validity of each transmitted potential failure mode is reached. In step 248, information is input into the facilitator workstation in order to compile a list of the validated potential failure modes. In step 250, the list of validated potential failure modes is displayed to the members of the group. In step 252, the members reach group consensus for the completeness and validity of the list of failure modes. In this changes may be recommended and group consensus is reached regarding the validity of the recommended changes. In step 254, information is input for revising the list of failure modes as required and in step 256 information is input for storing the list in a data base. Preferably the facilitator inputs to compile, revise, and to store the list. The following steps may be done repeatedly for each failure mode or they may be done in a sequence once for each failure mode in the list or they may be done one time for all the failure modes in the list together or any combination of these approaches since they are equivalent. In step 258, the members of the group are prompted to input the frequency of occurrence of the failure modes. The prompting may be oral or preferably the facilitator inputs information into the facilitator workstation for transmitting and displaying the prompts on the local display screens of the workstations.

In step 260, the group reaches consensus for the frequency of occurrence of potential failure modes. This step may be done by oral prompting and oral replay or more preferably is done in a manner similar to steps 242 through 254. In step 262 the frequencies of occupance are compiled for the failure modes and in step 264 information is input for storing the frequency of occurrence of failure modes in the data base. The input is preferably performed by the facilitator using the keyboard or mouse.

In step 266 information is input into the facilitator workstation for prompting members of the group to input potential effects of failure modes. In step 268 members simultaneously input potential effects of the failure modes into a plurality of the member workstations and transmit the input to the group display or to the local displays of other members. In step 270 the transmitted potential effects are displayed to the facilitator and to the other members. Preferably the information is displayed anonymously to encourage participation. The following steps of reaching consensus for numbers may be done by oral prompting and oral replay or more preferably is done in a manner similar to steps 242 through 254. In step 272 group consensus is reached for the completeness and validity of the list of potential effects of the failure modes. In step 274, group consensus is reached for a quantitative representation of the relative severity of the potential failure mode. In step 276 group consensus is reached for a quantitative representation of the likelihood of detection preventing the potential failure mode. In step 278 a risk prioritization number (RPN) is calculated preferably automatically, by multiplying the frequency of occurrence, times the number for the severity of the effect, times the likelihood of detection. In step 280, information is input into the facilitator workstation for storing the potential effects, the relative severity, the likelihood of detection, and the risk prioritization number into the data base. This step may be done after each quantity is determined or it may be done as described herein at one time after all the quantities are determined.

In FIG. 5, in step 282, information is input preferably into the facilitator workstation, to produce an FMEA report (see FIG. 10). In step 284, the system automatically retrieves and reorganizes the potential failure modes, components or process steps to which the potential failure modes apply, the effects of the failure modes, the estimated frequency of occurrence of the failure mode, the estimated severity of the effects, the likelihood of detection and the risk prioritization number, into a predetermined arrangement of multiple columns separated by vertical lines and having descriptive headers at the top of each column, and generates signals transmitted to the printer. In step 286 a draft FMEA report is printed. In step 288 a copy of the draft report is distributed to each member. In step 290 group consensus is reached on either the correctness of the report or on required changes to the report. If changes are required at 292, then in step 294 changes are input into the data base through input means which is preferably the keyboard of the facilitator workstation, and steps 282 through 290 are repeated.

Figures 6, 7:
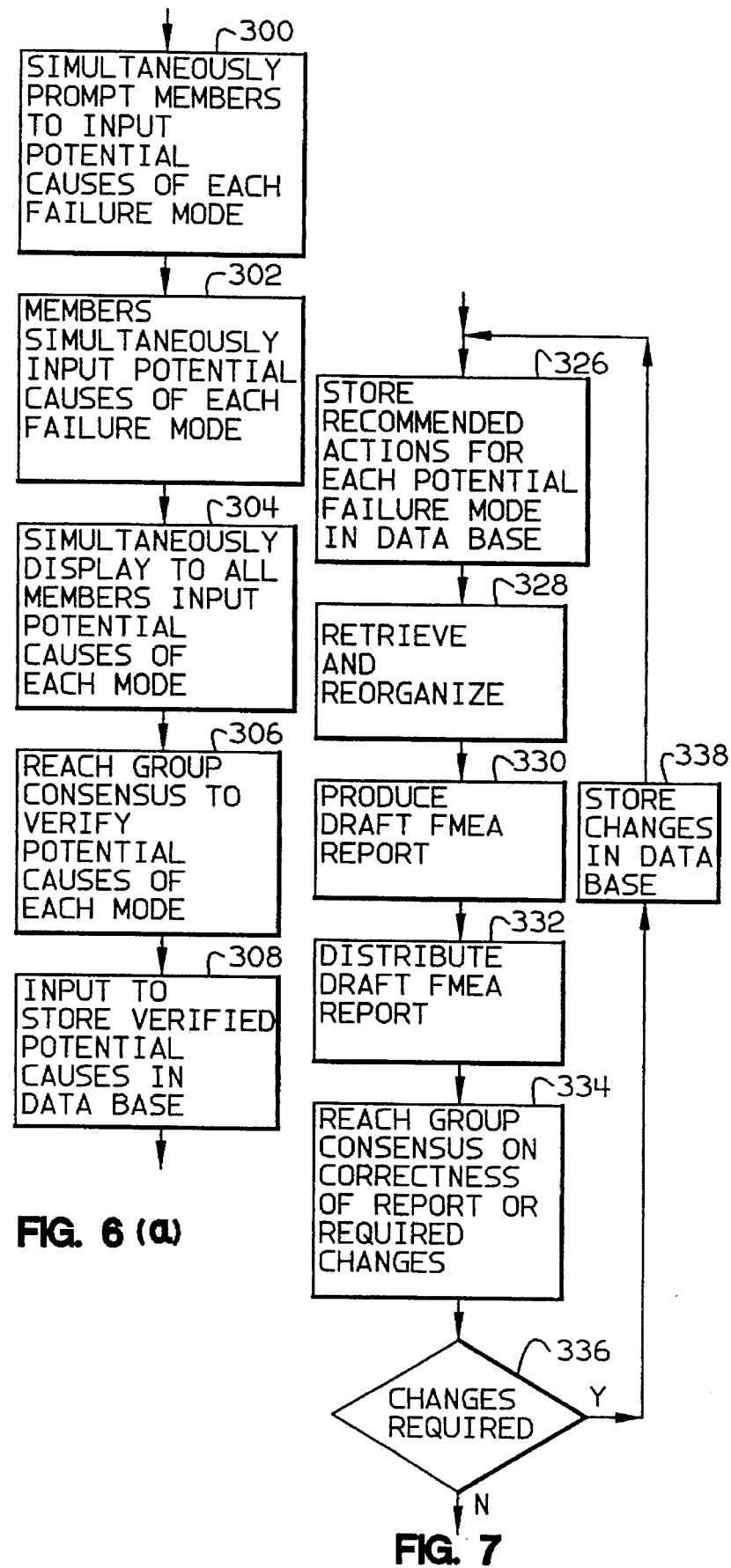

In FIGS. 6 and 7, in the same meeting or preferably in a plurality of subsequent defect analysis group meetings each for one or more failure modes, the following steps are performed. The following steps may be performed once for each failure mode in multiple sequences of steps as described below or each step may address a group of failure modes or some combination of these methods may be used since they are equivalent. In step 300 information is input preferably into the facilitator workstation, for prompting members of the group to input potential causes of a failure mode. In step 302 potential causes of the failure mode are simultaneously input into a plurality of the member workstations and transmitted to the system. In step 304, the transmitted potential causes are displayed to the facilitator and members preferably anonymously. In step 306 group consensus is reached for the completeness and validity of the potential causes of the failure mode. This step may be done by oral prompting and oral replay or more preferably is done in a manner similar to steps 242 through 254.

In step 308, information is input into the facilitator workstation for storing the validated list of potential causes of the failure mode in the data base. In step 310 information is input into the facilitator workstation for prompting members of the group to input current controls for preventing the failure mode. In step 312, current controls for the failure mode are simultaneously input into a plurality of the member workstations and transmitted through the network. In step 314 the transmitted current controls are displayed to the facilitator and preferably to the members preferably anonymously. In step 316, group consensus is reached for the completeness and validity of a list of current controls for the failure mode. Again, this step may be done by oral prompting and oral replay or more preferably is done in a manner similar to steps 242 through 254.

In step 318 information is input preferably into the facilitator workstation, for storing the current controls for the failure mode in the data base. In step 320, information is input preferably into the facilitator workstation, for prompting members of the group to input recommended actions for reducing the risk prioritization number of the failure mode simultaneously inputting recommended actions of the failure mode into a plurality of the member workstations and transmitting the input. In step 322 the recommended actions are displayed to the facilitator and preferably also simultaneously to members, preferably anonymously. In step 324, group consensus is reached for the completeness and validity of the list of recommended actions for the failure mode. Again, this step may be done by oral prompting and oral replay or more preferably is done in a manner similar to steps 242 through 254.

In FIG. 7, in step 326, information is input into the facilitator workstation for storing the recommended actions for the failure mode in the data base. In step 328, the system automatically retrieves and reorganizes the potential failure modes, components or process steps to which the potential failure modes apply, the effects of the failure modes, the estimated frequency of occurrence of the failure mode, the estimated severity of the effects, the likelihood of detection, the risk prioritization number, the causes of the failure mode, the current controls to prevent the failure mode, and the recommended action to reduce the risk prioritization number, into a predetermined arrangement of multiple columns separated by vertical lines and having descriptive headers at the top of each column, and generates signals transmitted to the printer. In step 330 a draft FMEA report is printed. In step 232 a copy of the draft report is distributed to each member. In step 334 group consensus is reached on either the correctness of the report or on required changes to the report. If changes are required at 336, then in step 338 changes are input into the data base through input means which is preferably the keyboard of the facilitator workstation, and steps 326 through 334 are repeated.

Figures 6, 9:
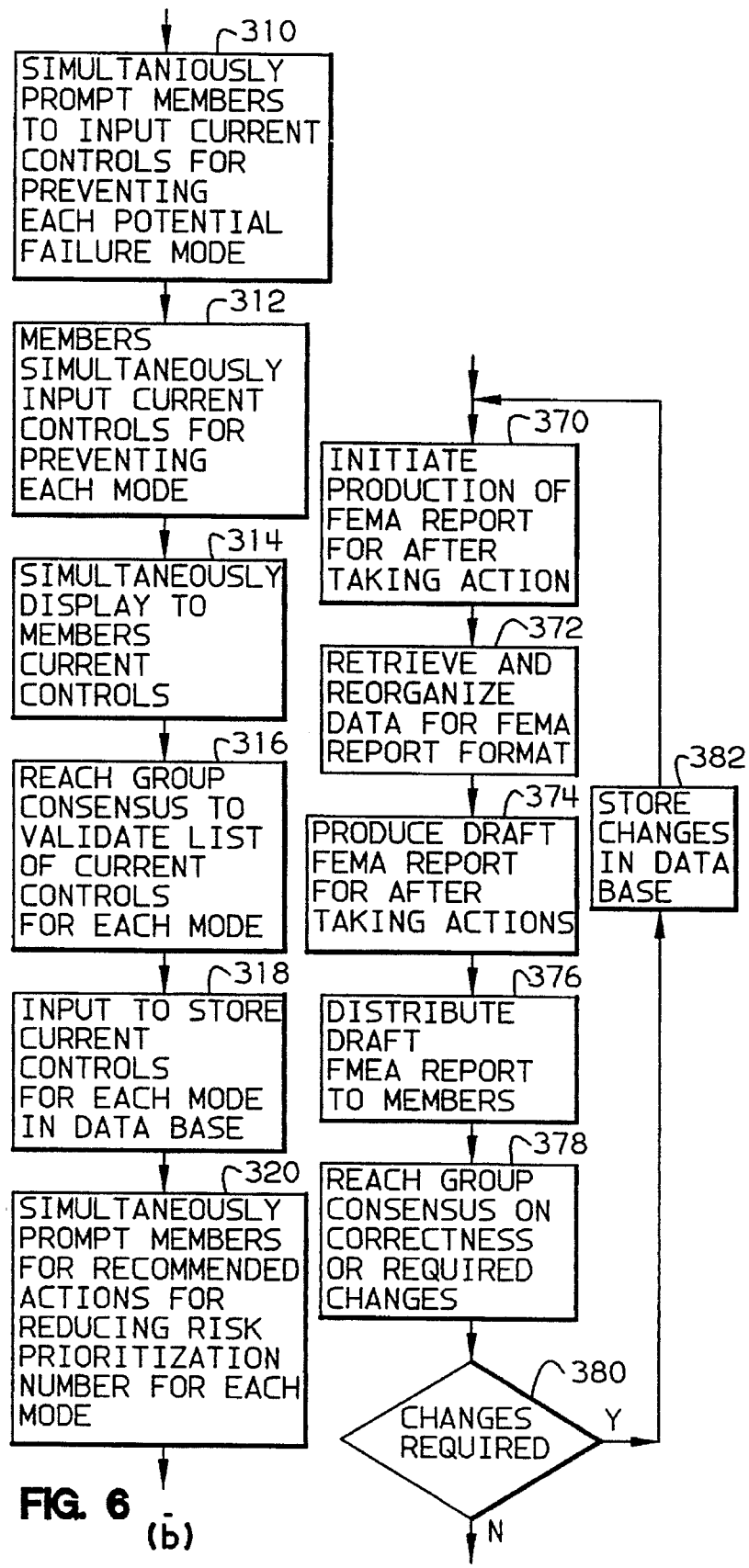
Figure 6:
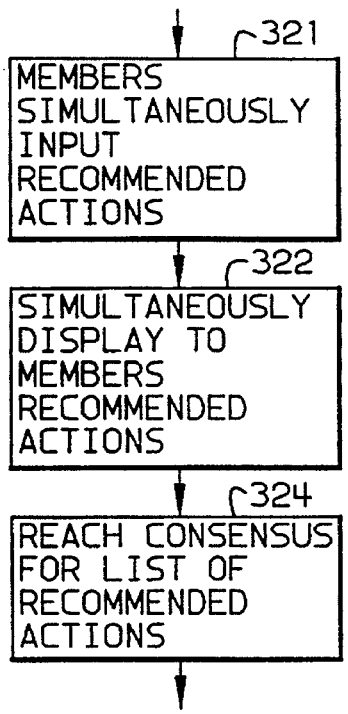
Figure 8:
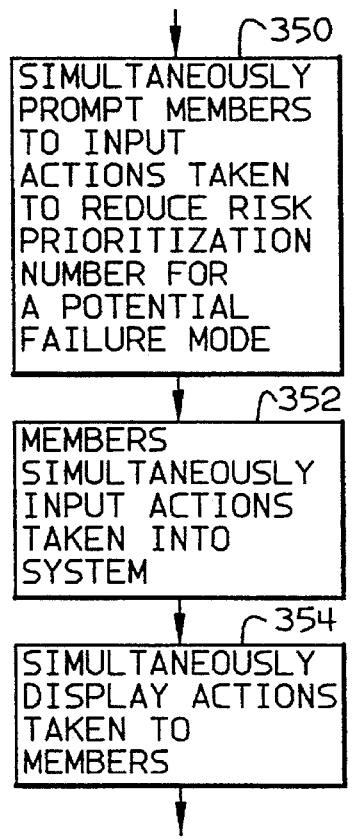
Figure 8:
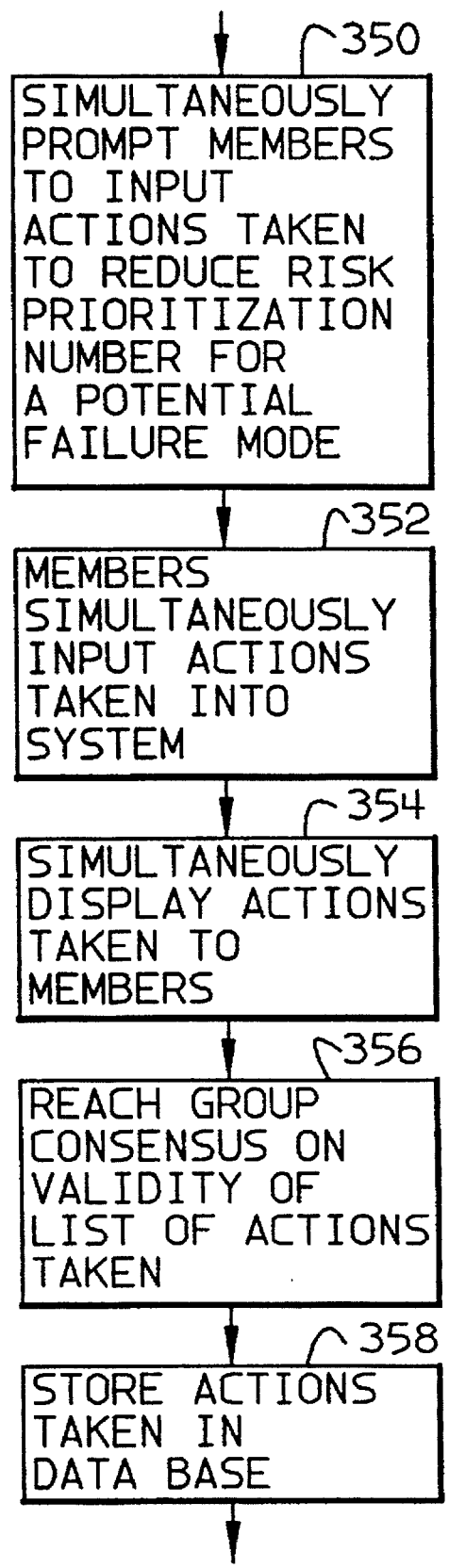
Figure 8:
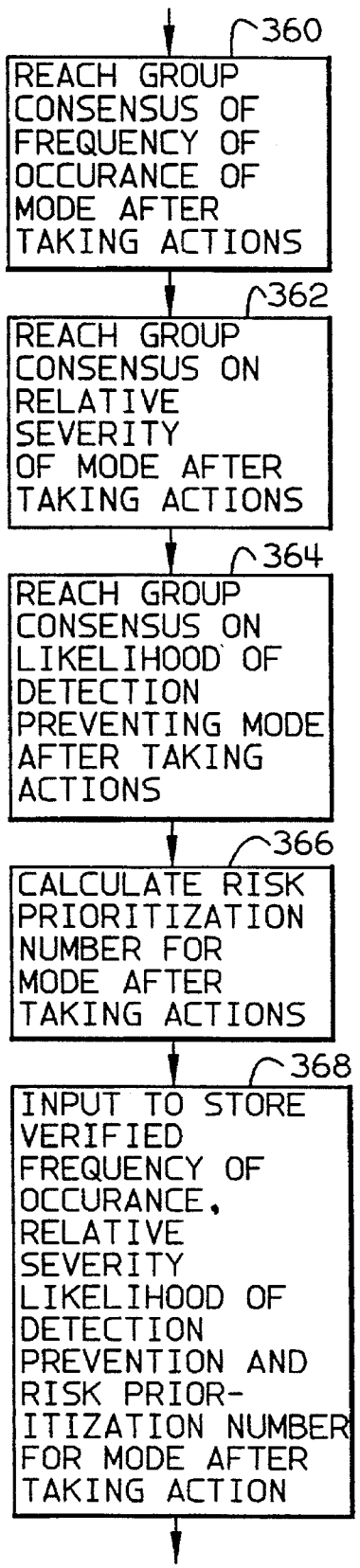

In FIGS. 8 and 9, in one or more subsequent results assessment group meetings each for one or more failure modes, the following steps are performed. The following steps may be performed once for each failure mode in multiple sequences of steps as described below or each step may address a group of failure modes or some combination of these methods may be used since they are equivalent. In step 350, information is input into the facilitator workstation for prompting members of the group to input actions taken to reduce risk priority number of a failure mode. In step 352 actions taken for the failure mode are simultaneously input into a plurality of the member workstations and transmitted into the network. In step 354 the transmitted actions taken are displayed to the facilitator and preferably to the members anonymously. In step 356, group consensus is reached for the completeness and validity of the list of actions taken for the failure mode. This step may be done by oral prompting and oral replay or more preferably is done in a manner similar to steps 242 through 254. In step 358, information is input into the facilitator workstation for storing the list of actions into the data base.

In step 360 group consensus is reached for the frequency of occurrence of the potential failure mode after taking the actions. In step 362 group consensus is reached for a quantitative representation of the relative severity of the potential failure mode after taking the actions. In step 364, group consensus is reached for a quantitative representation of the likelihood of detection preventing the potential failure mode after taking the actions. In step 366, a risk prioritization number after taking the actions is automatically calculated by multiplying the frequency of occurrence after taking the actions, times the number for the severity of the effect after taking the actions, times the likelihood of detection after taking the actions. In step 368, information is input into the facilitator workstation for storing the frequency of occurrence after taking the actions, the relative severity after taking the actions, the likelihood of detection after taking the actions, and the risk prioritization number after taking the actions into the data base.

In FIG. 9, in step 370, information is input preferably into the facilitator workstation, to produce an FMEA report. In step 372, the system automatically retrieves and reorganizes the potential failure modes, components or process steps to which the potential failure modes apply, the effects of the failure modes, the estimated frequency of occurrence of the failure mode, the estimated severity of the effects, the likelihood of detection and the risk prioritization number, the causes of the failure mode, the current controls to prevent the failure mode, the recommended actions to reduce the risk prioritization number, the actions taken, the frequency of occurrence after taking the actions, the relative severity of the effects after taking the actions, the likelihood of detection after taking the actions, and the risk priority number after taking the actions, into a predetermined arrangement of multiple columns separated by vertical lines and having descriptive headers at the top of each column, and generates signals transmitted to the printer. In step 374 a draft FMEA report is printed. In step 376 a copy of the draft report is distributed to each member. In step 378 group consensus is reached on either the correctness of the report or on required changes to the report. If changes are required at 380, then in step 382 changes are input into the data base through input means which is preferably the keyboard of the facilitator workstation, and steps 370 through 378 are repeated.

In the above process described in steps 220 through 350 reaching group consensus may include: inputting information into the facilitator workstation for prompting the members to vote; inputting information into the member workstations to vote; and automatically tabulating the votes and displaying the results to the facilitator and preferably also simultaneously to the members of the group. Also, anonymously displaying to the group may include: anonymously displaying the transmitted input on the group display; and anonymously displaying the input transmitted from the member workstations on one or more displays of other member workstations. Finally, inputting and transmitting input may include: inputting to enter information; inputting to edit the information; and inputting to transmit the edited information.

This invention provides a more efficient means to collect and organize the data captured during FMEA sessions and a process to transform the data into a format usable by existing database and word processing software tools.

An example of a system using existing tools whenever available will now be provided. IBM's group-ware product, TEAMFOCUS(R), is used in facilitated work sessions for FMEA. TEAMFOCUS(R) is a group-ware product that provides group decision support functions such as:

Electronic Brainstorming

Idea Organization

Voting

Topic Commenting

Alternative Evaluation

Group Outlining

Group Matrix

Following the facilitated sessions the resulting data is stored in a database tool such as Microsoft Access(TM), thus making the data available for documentation. The documents are produced automatically by specialized bridge programs that use a word processor, such as IBM BookMaster. The documents can be stored in a another groupware tool for document management, such as Lotus-Notes(TM) provided by LOTUS Corp.

Facilitated work sessions using group-ware products for FMEA include several categories of sessions, each described below.

Figure 11:
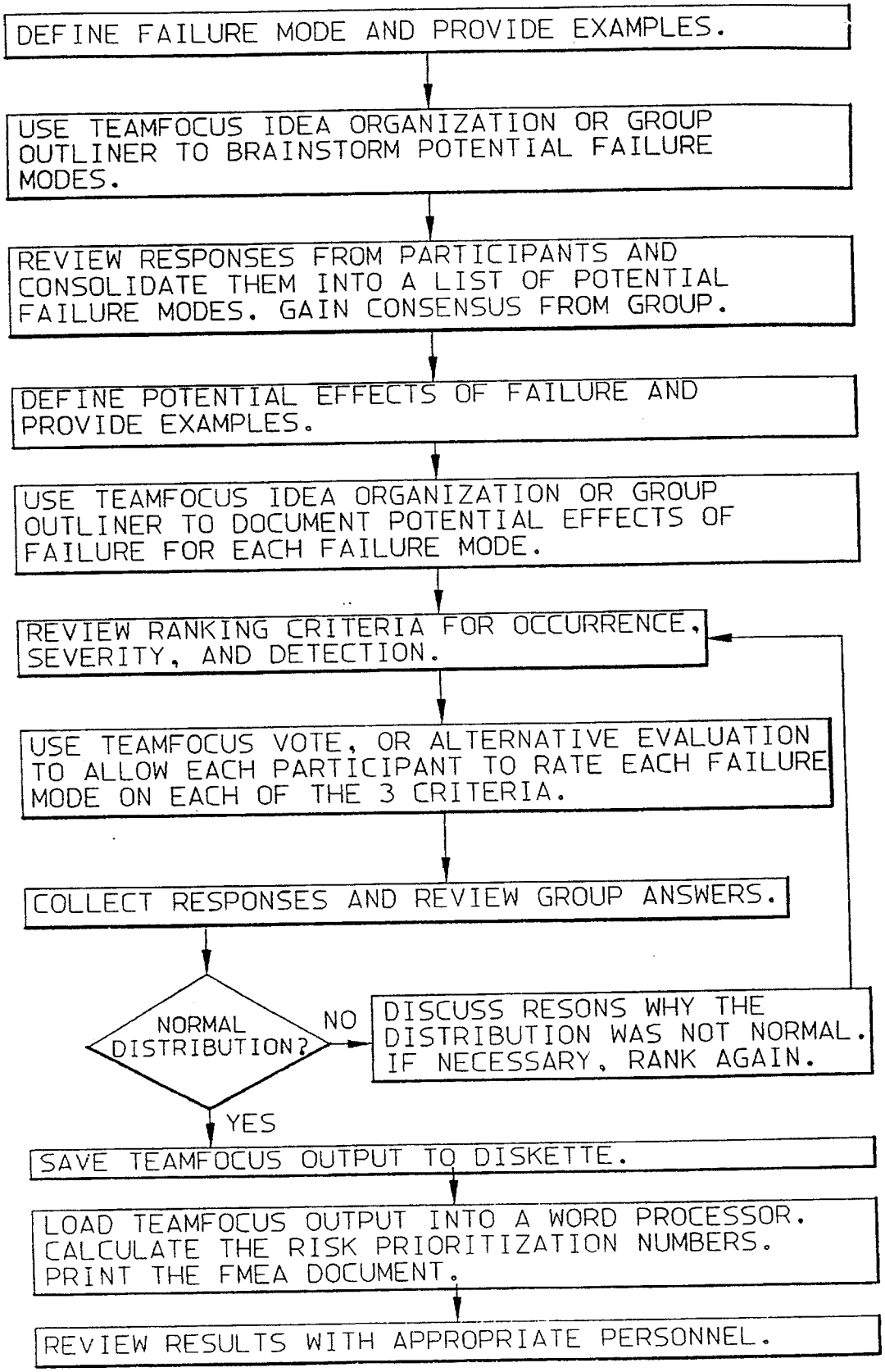
FIG. 11 is a description of the session for Defect Identification and Prioritization.

The Defect Identification and Prioritization Session develops a list of failure modes for a given process or product. Referring to FIG. 11, the FMEA team members gather in a joint meeting to provide input in response to questions provided by a facilitator, shown as a PC (2) in FIG. 14. The PC server (5), operating system (6) and applications (6) are also shown. The session can also include a projector (4) and screen (3) for viewing and a printer (7) for hardcopy output. Each workgroup member participates in the meeting via a PC (1) and the questions and answers may be selectively displayed on the screen or on each PC.

Referring to FIG. 11, the Defect Identification and Prioritization Session starts with a review of the definition of a failure mode or defect. Next comes brainstorming of potential failure modes in TEAMFOCUS(R) in either the Idea Organization tool or the Group Outliner tool. Each member of the group suggests one or more potential failure modes. Both the Idea Organization tool and the Group Outliner tool in TEAMFOCUS(R) allow each participant to view the other participant's answers. When everyone has made their suggestions, the suggestions are reviewed and consolidated into a group list. All participants must concur with the group list. The facilitator can provide interpretation and instruction as needed, since FMEA methodology may be unfamiliar to some of the participants. For each potential failure mode in the group list, the potential effects of the failure are noted, again in the TEAMFOCUS(R) tool. The potential failure modes are then ranked according to 3 criteria — frequency of occurrence, severity, and likelihood of detection. The TEAMFOCUS(R) Voting tool or Alternative Evaluation tool is used to capture the group ranking. A quick review of the ranking results in the tool will identify any anomalies, such as a bi-modal distribution of rankings. When this occurs, discussion can take place to understand the reasons why differences of opinion exist. If necessary, that ranking can be done again. At the end of the session, the TEAMFOCUS(R) session output is copied to diskette and loaded into a word processor. The session output can either be formatted in the word processor tool or in a specialized program. In either case, a document is created and printed out for the participants. The risk prioritization number is calculated for each potential failure mode by multiplying the ranking results on the 3 criteria and is included on the FMEA document. The FMEA document is also stored in another group-ware tool called LOTUSNOTES(R) where it can be accessed by others in the organization.

Figure 12:
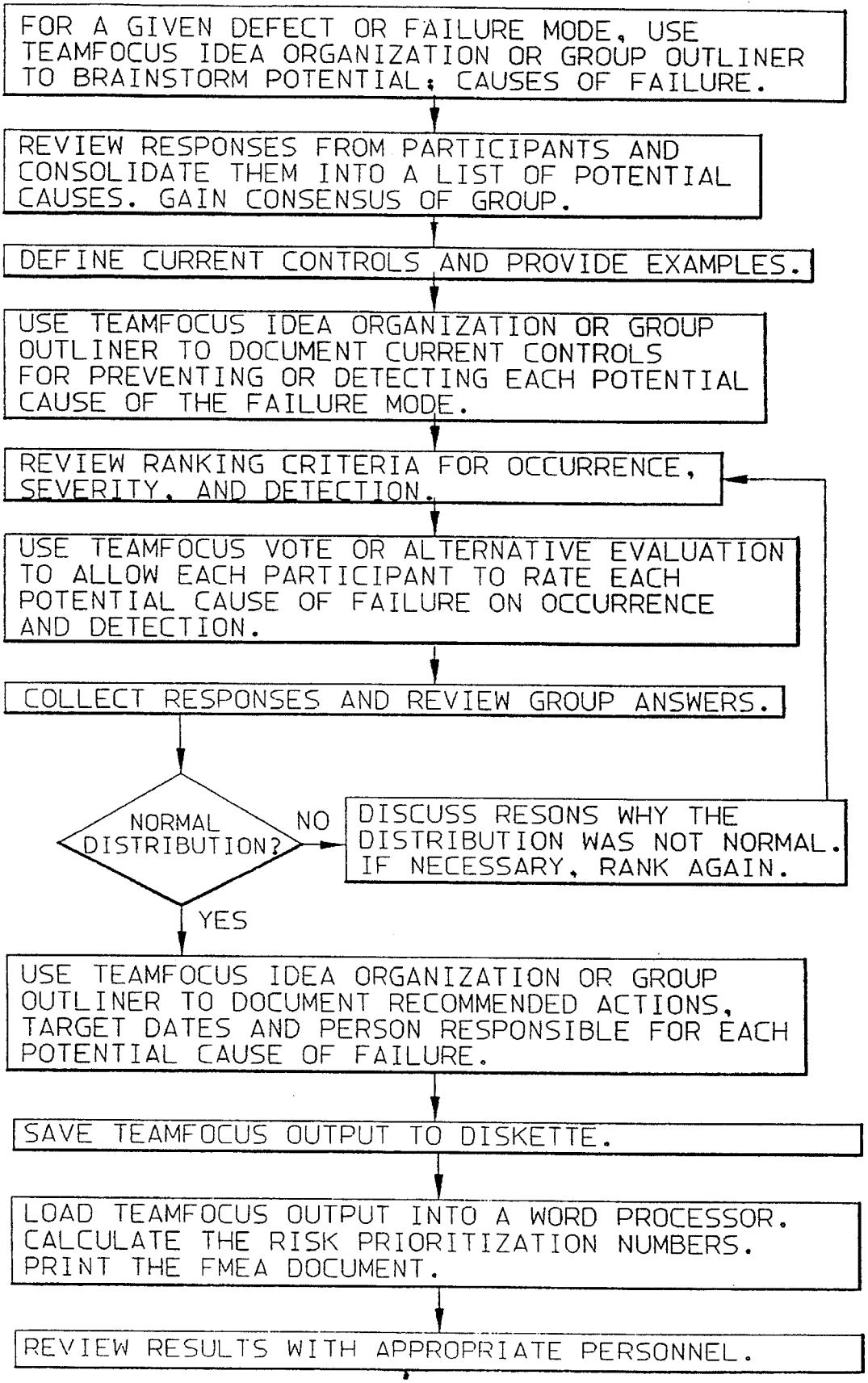
FIG. 12 is a description of the session for Defect Analysis.

The Defect Analysis Sessions develop a list of potential causes of a given failure mode. Referring to FIG. 12, a Defect Analysis Session starts with brainstorming of potential failure modes in TEAMFOCUS(R) in either the Idea Organization tool or the Group Outliner tool. Each member of the group suggests one or more potential cause of the failure. Both the Idea Organization tool and the Group Outliner tool in TEAMFOCUS(R) allow each participant to view the other participant's answers. When everyone has made their suggestions, the suggestions are reviewed and consolidated into a group list. All participants must concur with the group list. The facilitator can provide interpretation and instruction as needed, since FMEA methodology may be unfamiliar to some of the participants. For each potential cause of failure in the group list, any current controls on that cause are noted, again in the TEAMFOCUS(R) tool. The potential causes of failure are then ranked according to 2 criteria — frequency of occurrence and likelihood of detection. The ranking for severity of the failure mode itself is automatically applied to the potential causes of that failure. The TEAMFOCUS(R) Voting tool or Alternative Evaluation tool is used to capture the group ranking. A quick review of the ranking results in the tool will identify any anomalies, such as a bi-modal distribution of rankings. When this occurs, discussion can take place to understand the reasons why differences of opinion exist. If necessary, that ranking can be done again. Also for each potential cause of failure in the group list, any recommended actions to prevent that cause from occurring or to detect that cause when it does occur are noted, again in the TEAMFOCUS(R) tool. At the end of the session, the TEAMFOCUS(R) session output is copied to diskette and loaded into a word processor. The session output can either be formatted in the word processor tool or in a specialized program. In either case, a document is created and printed out for the participants. The risk prioritization number is calculated for each potential cause of failure by multiplying the ranking results on the 3 criteria and is included on the FMEA document. The FMEA document is also stored in another group-ware tool called LOTUSNOTES(R) where it can be accessed by others in the organization.

Figure 13:
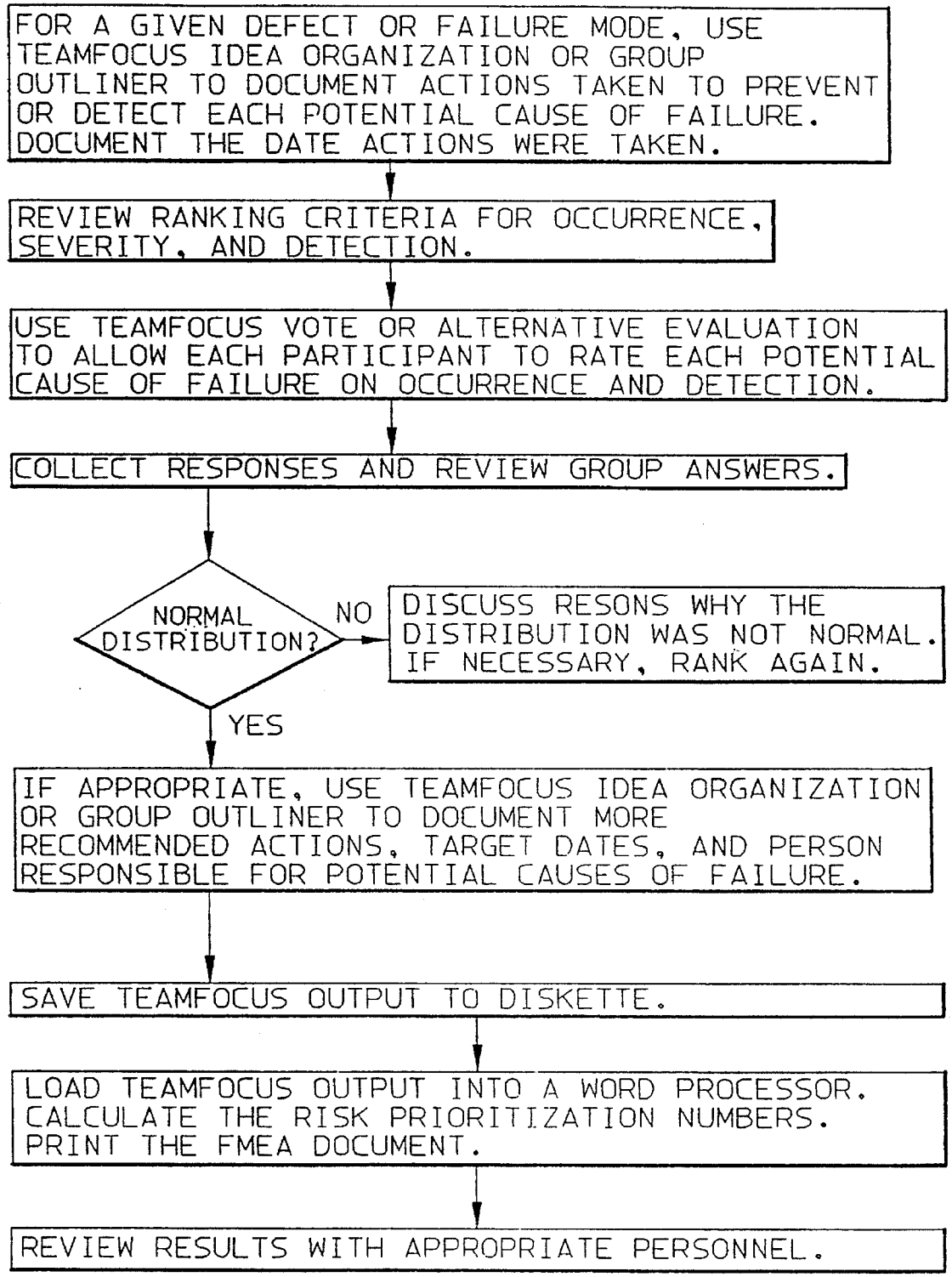
FIG. 13 is a description of the session for Results Assessment.
Figure 17:
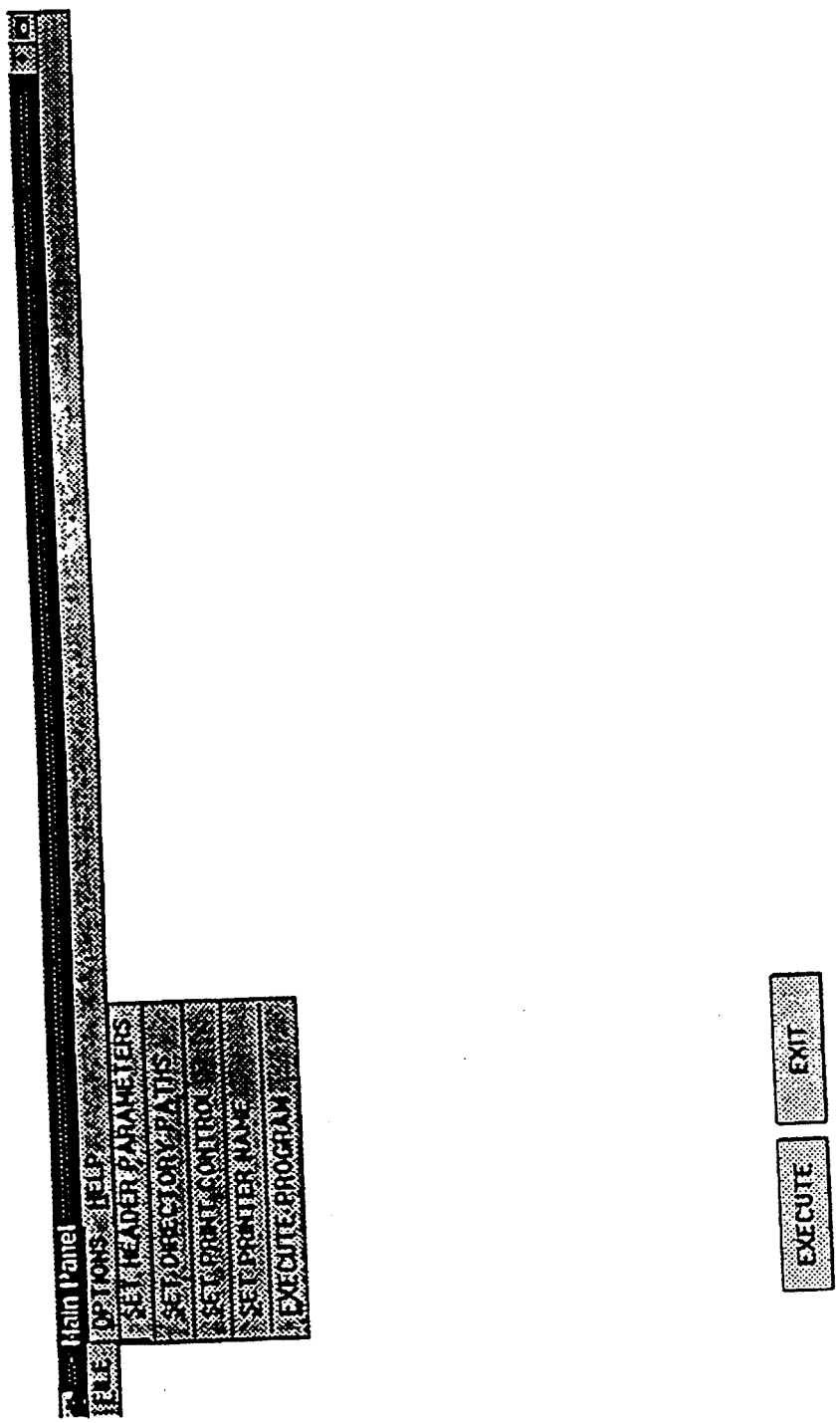
FIGS. 17 through 21 are sample screens from the FMEA bridge program user interface.
Figure 18:
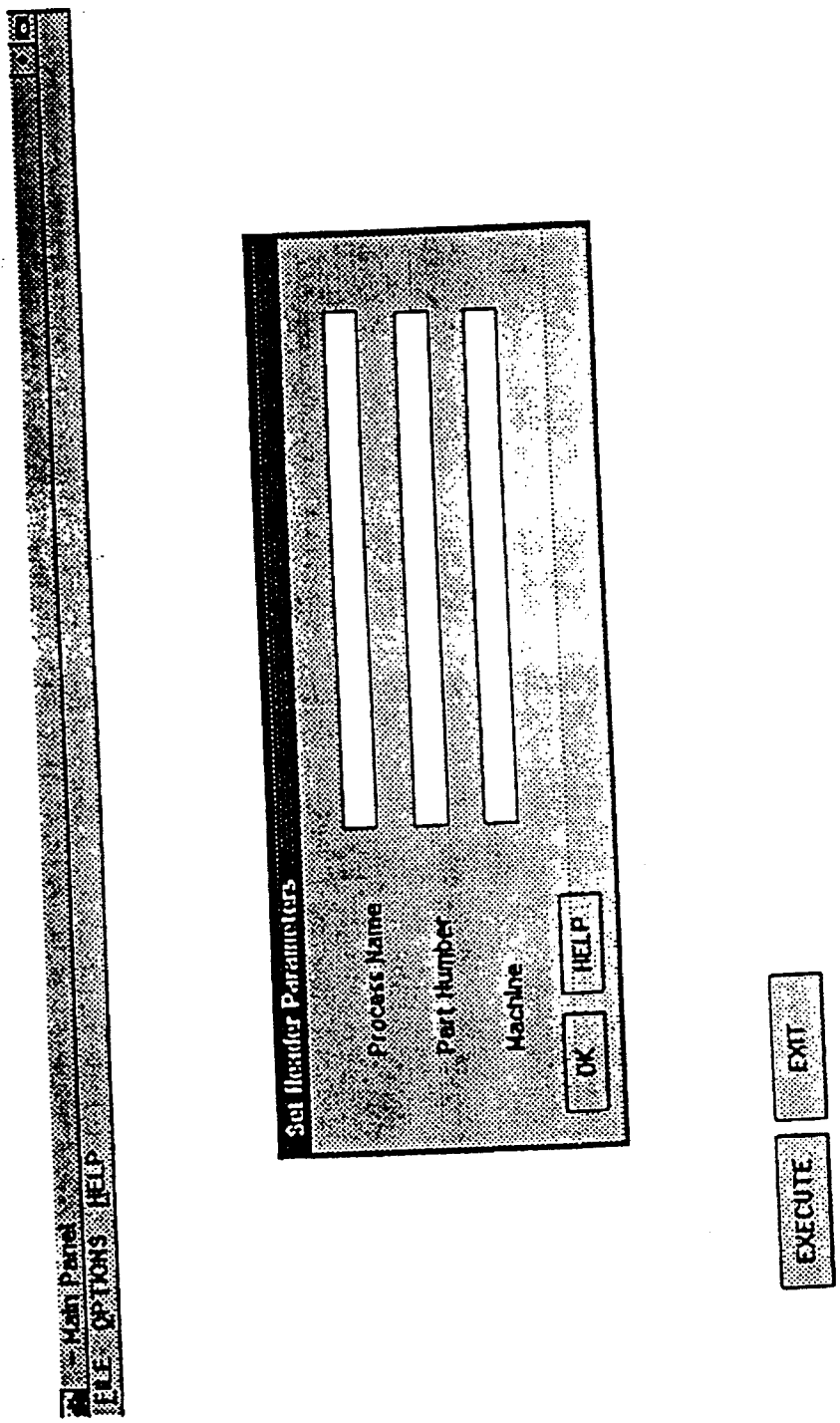
Figure 19:
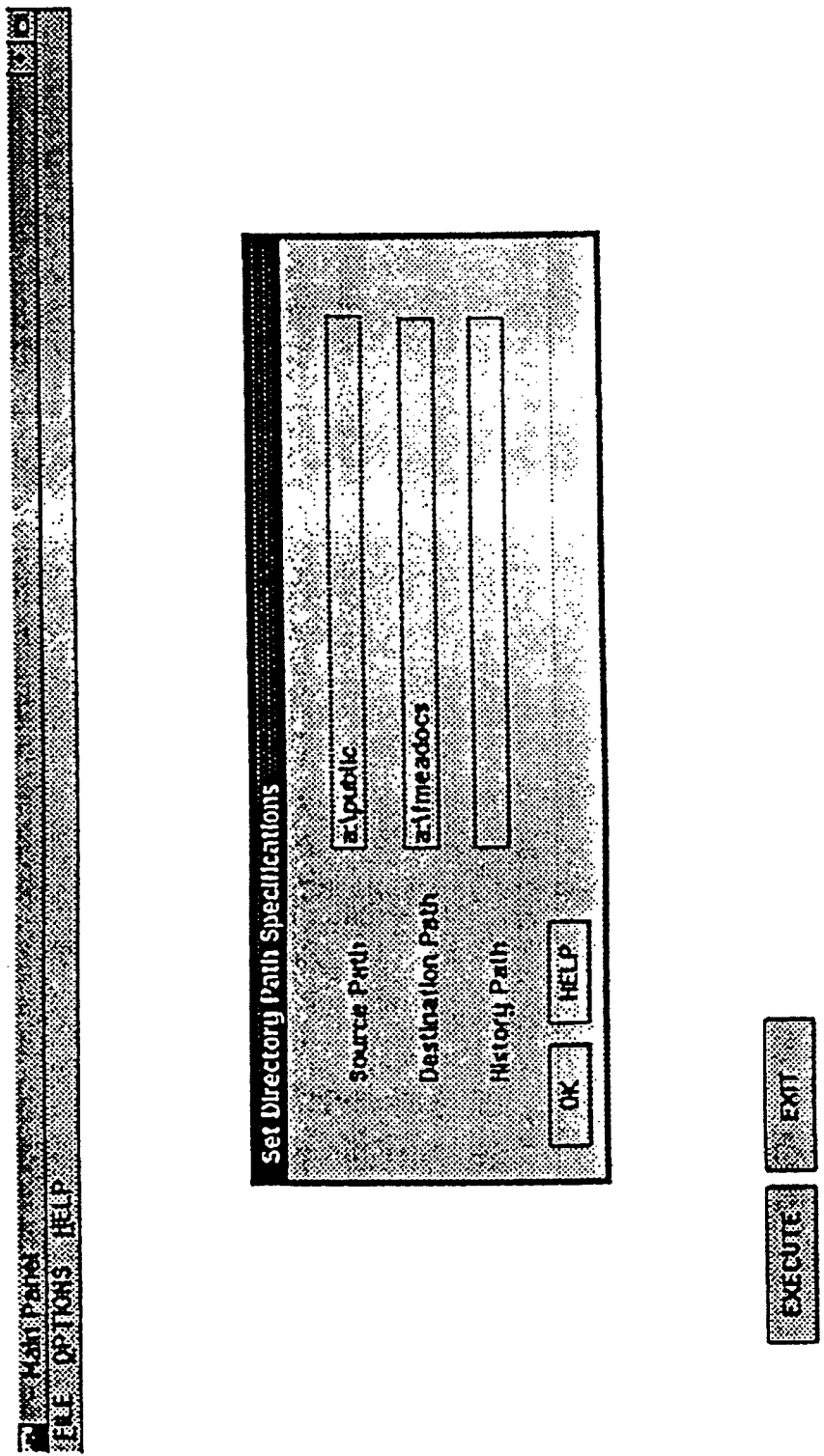
Figure 20:
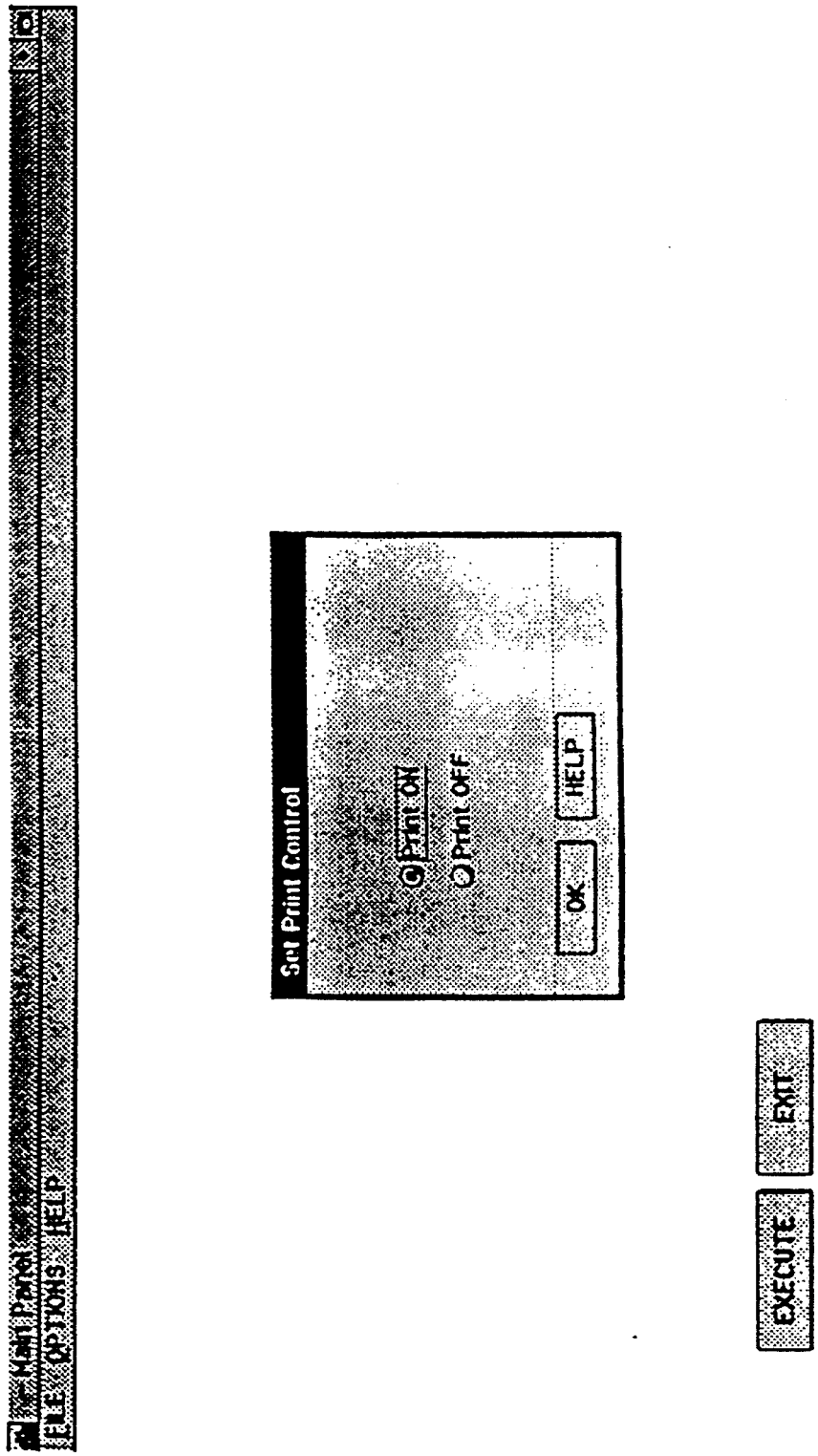
Figure 21:
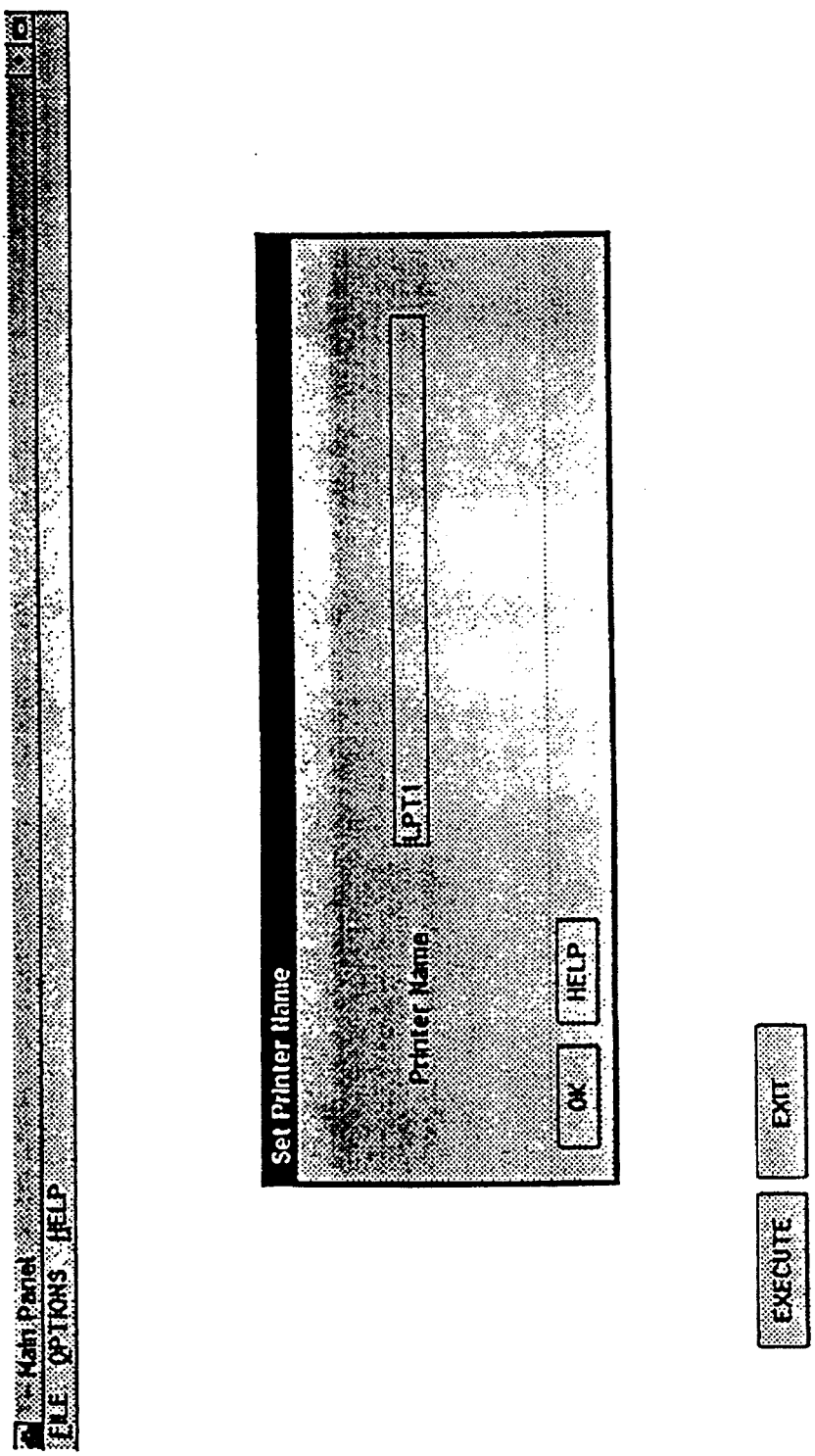

The Results Assessment Sessions examine the effectiveness of the actions taken to prevent or detect the causes of failure for a given failure mode. Referring to FIG. 13, the Results Assessment Session starts with documenting the actions taken and the date on which the actions were taken for each potential cause of failure. These actions are documented in TEAMFOCUS(R) in either the Idea Organization tool or the Group Outliner tool. The potential causes of failure are then ranked again according to the same 2 criteria as before — frequency of occurrence and likelihood of detection. The ranking for severity of the failure mode itself is automatically applied to the potential causes of that failure, as before. The TEAMFOCUS(R) Voting tool or Alternative Evaluation tool is used to capture the group ranking. A quick review of the ranking results in the tool will identify any anomalies, such as a bi-modal distribution of rankings. When this occurs, discussion can take place to understand the reasons why differences of opinion exist. If necessary, that ranking can be done again. The purpose of this ranking is to determine the effectiveness of the actions. If the actions taken were effective, then the resulting risk prioritization number should be lower than before. If the actions taken were not effective enough, additional recommended actions to prevent that cause from occurring or to detect that cause when it does occur are noted, again in the TEAMFOCUS(R) tool. At the end of the session, the TEAMFOCUS(R) session output is copied to diskette and loaded into a word processor. The session output can either be formatted in the word processor tool or in a specialized program. In either case, a document is created and printed out for the participants. The FMEA document is also stored in another group-ware tool called LOTUSNOTES(R) where it can be accessed by others in the organization.

The TEAMFOCUS sessions produce data files comprised of all the groups' responses to the facilitator's prompts for information. Upon execution of the bridge programs these files are formatted into import files for various tools. Also, the files can be formatted into printed documents, such as the FMEA document, automatically.

Referring to FIG. 15 showing a pseudocode implementation of the bridge program EXPORT, this specialized program used by IBM bridges data from a TeamFocus Idea Organization (IO) session to a DBASE III (TM) database file. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They can be changed by the user if need be. The user can select as many sessions as desired to be exported. When OK is clicked, the EXPORT program validates all data fields entered by the user. If all is valid, the Session Id for the first selected session is used to determine input file names. The file containing all the IO list items and their associated comment file names is named "LIST_x.IO" where x is the Session Id. The first LIST—x. IO record is read and assigned to the Idea field. The next line is then read and assigned to the Comment File Name variable. This represents the name of the file that contains any comments associated with that Idea. If the Comment File exists, then each line of the file is read and appended to the Comment field. Session Id, Idea, and Comment are then written to the DBASE III database file. This process of reading and processing 2 LIST_x.IO lines at a time is then repeated until the file is empty.

Referring to FIG. 16 showing a pseudocode implementation of the bridge program FMEA, this specialized program used by IBM bridges data from a TeamFocus Idea Organization (IO) session to an IBM Bookmaster file that produces the documentation from FMEA sessions. The program begins by reading in the values set by the user in the Options pull-down menu. (Reference the sample screens in FIGS. 17–21). These include:

Header Parameters

Directory Paths

Print Control

Printer Name

Header parameters allow for customized titles for the FMEA documents. The directory paths establish the source directory where the TeamFocus data is found and the destination directory where the Bookmaster file is written. Print Control determines whether or not to route the document to a printer. The printer name is needed if Print Control is turned on. Next the program verifies that all of the input files exist. Then it sets up the page header information by writing out the document title and date. At this point, the program begins to construct the body of the document, which is a Bookmaster table. It reads the LIST_x.IO file to determine the Level 1 entries and their corresponding comment file. It opens the table, starts the first row, and reads the C_x-n.IO comment file for the first Level 1 entry. Each field of information in the comment file becomes a column in the table. The various fields of information in the comment files can be distinguished either by tags or by skipping a line. When all of the fields are written for that particular Level 1 entry, the program begins a new row and reads the comment file for the next Level 1 entry. This continues for each Level 1 entry. When all Level 1 entries have been processed, the table is closed and the output file is closed. The program executes the word processor program that formats the output file with its Bookmaster commands in a document. If print control is turned on, the appropriate print command is executed to sent the document to the designated printer. The output file is copied to the destination directory and the program ends.

Other bridge programs can similarly be written for various analysis tools chosen by the FMEA team. Other tools might include spreadsheet or flow-charting tools. The advantages offered by the bridge programs are in time saving and accuracy, as the data need not by manually keyed into each tool.

The combination of facilitated work sessions and group-ware products, when applied to the FMEA methodology, allows an organization to optimize its resources to achieve results in less time than it would otherwise have required. The facilitated work sessions allow the FMEA work team to focus their efforts and make effective use of their time. They also promote teamwork and ownership of the quality information identified in the FMEA work sessions. The group-ware tools allow the work team to quickly collect, organize, and document their ideas. Instead of the usual iterations and reviews by committee, the failure modes and causes are identified correctly the first time and agreed to by all participants. Also these tools provide a more accurate and immediate ranking of the potential failure modes and causes of the failure mode against the 3 criteria. At the end of the facilitated session, the team has immediate documentation of their work. The use of these tools ensures that everything is documented in the exact words of the FMEA team members. The specialized bridge program ensures that the resulting FMEA document is produced quickly and is immediately available to all participants to document the results of the FMEA session. The group-ware tools also allow for the proper management of the documentation, making immediate access throughout the organization possible.

Review of manual methods of performing FMEA revealed many problems. Work done by individuals must be reviewed by others in order to assure correctness. Numerous iterations of drafts and reviews are generally required before all parties concur with the decision or document. These iterations require time. Facilitated work sessions utilizing group-ware tools improve the process by avoiding the iterations and involving the right people up front.

Work done by groups often lacks in quality because of unequal participation among team members. Typically a small percentage of the group dominate the discussions and exert undue influence over the resulting decision or document. Other members of the group may not buy into the resulting decision or document as a result. The implications of this generally don't show up until later on when recommended actions are not taken. Again, time is required to sort this out and correct the problem. Rework is often required to document the decision or process so that everyone is in agreement. Facilitated work sessions utilizing group-ware tools improve the process by giving everyone an equal voice and gaining consensus up front.

The process described in the example above is not the only alternative for integrating group-ware and the FMEA methodology. Other group-ware tools exist besides TEAMFOCUS(R) and LOTUSNOTES(R) that can be used in their place. For example, Ventana Corporations markets System V (TM). In addition, the methodology can be applied outside the scope of manufacturing products and processes. For example, it can be successfully applied to manufacturing or development equipment. It can also be applied to any non-manufacturing process, such as a business process or a hospital process. As long as a defect, or "failure mode", can be defined for the process, the FMEA methodology using group-ware tools is effective.

The groupware tools and software applications (excluding the bridge programs) identified in the preceding description of the invention are well known articles of commerce, and are not described in any further detail than that included here.

It will be appreciated that, although specific embodiments of the invention have been described herein for purposes of illustration, various modifications may be made without departing from the spirit and scope of the invention. Accordingly, the scope of protection of this invention is limited only be the following claims and their equivalents.

We claim:

1. A computer network, comprising:

multiple workstations connected together to form a communications network;

computer input means for inputting information into the network at a plurality of the workstations, including multiple keyboards each connected for communication with a respective workstation;

computer controlled display means including a screen for displaying information locally at multiple respective workstations;

means for producing output that can be retained in tangible form separately from the system, depending on signals transmitted from the network;

means for designating one of the workstations with input means and display means, as a facilitator workstation and a plurality of other workstations as member workstations;

transmitting signals for prompting through the network to the member workstations, to display prompts on the screens of member workstations depending on input into the input means of the facilitator workstation;

means for displaying on the screens of member work stations, text entered into input means at the member workstations and for editing the input text;

means for selectively transmitting the edited input text and for simultaneously displaying the transmitted text on display means visible at a plurality of other member workstations and at the facilitator workstation;

means for inputting into input means at member workstations a vote to reach agreement regarding validity and completeness of the transmitted text and numeric information, and for automatically tabulating the votes and reporting results of the vote on at least one of the computer controlled displays;

means for editing to create a data base of textual and numeric information depending on the agreement regarding the validity of the transmitted text and validity of the numeric information;

means for identifying textual information entries in the data base as a potential failure mode type information;

means for identifying other information entries in the data base as other types of information, including:
   textural information as either:
      a description of the component or process step to which a potential failure mode applies;
      a potential effect of a potential failure mode; or
      a potential cause of a potential failure mode; and
   numeric information as either:
      an estimated frequency of occurrence of a potential failure mode; or
      an estimated severity of the effects of a potential failure mode;

means for relating entries of other types of information to a potential failure mode type entry in the data base; and means for generating signals and transmitting signals to the means for producing output, for generating a report in which potential failure mode type entries are listed in at least one column identified for potential failure modes and the other entries are listed in multiple other columns each of the other columns for one or more types of other entries and in which the report indicates which potential failure mode entry other types of entries are related to.

2. The computer network of claim 1, further comprising: a screen for display to a group, connected to the facilitator workstation, showing at least 2000 characters readable from all of the other workstations.

3. The computer network of claim 1, in which:

each workstation includes a local screen and a keyboard and computer pointer device; and the means for producing a tangible output includes a dot addressable page printer.

4. The computer network of claim 1, in which:

the means for identifying other information entries in the data base as other types of information, further include:
   textural information as either:
      a current control to prevent the potential causes or effects of a potential failure mode; or
      recommended action to reduce risk of the potential failure mode; and
   numeric information as either:
      a likelihood of detecting a potential failure mode;
      risk of a potential failure mode;
      estimated frequency of occurrence of a potential failure mode after taking the recommended action;
      estimated severity of the effects of a potential failure mode after taking the recommended action;
      likelihood of detecting a failure mode after taking the recommended action; or
      risk of a potential failure mode after taking the recommended action; and the means for relating entries relates all of the other types of information to a potential failure mode type entry in the data base.

5. The computer network of claim 1, comprising:

multiple workstations connected together to form a communications network;

computer input means for inputting information into the network at each workstation, including a keyboard and a computer pointer connected for communication to each respective workstation;

computer controlled display means, including:
- a screen for local display connected for control by each workstation, for displaying information at each respective workstation, and
- a group display screen showing at least 2000 characters readable from all of the other workstations;

a dot addressable page printer for printing paper output depending on signals transmitted from the network;

means for designating the workstation to which the group display is connected as a facilitator workstation, one of the workstations as a file server, and all the other workstations as member workstations;

means for transmitting prompts from the facilitator workstation to all the member workstation over the network, depending on input into the input means of the facilitator workstation;

means for displaying prompts on the group screen of the facilitator workstation;

means for displaying the transmitted prompts in a first window of the local display screen of respective member workstations and for editing the prompts;

means for displaying in a second window of the local screen of respective member workstations, text entered into the keyboard of the respective member workstations and for editing the input text in the second window;

means for selectively transmitting the edited input text and for simultaneously displaying the transmitted text in a third window of the local screen at each of the member workstations and displaying the transmitted text on the group screen of the facilitator workstation;

means for inputting into input means a vote to reach agreement regarding validity and completeness of the transmitted textual and numeric information, and for automatically tabulating the votes and reporting results of the vote on at least one of the computer controlled displays;

means for automatically calculating a risk or priority for a potential failure mode by automatically multiplying estimated frequency of occurrence, times a number for estimated severity, times likelihood of detection;

means for editing to create a data base of textual and numeric information depending on the agreement regarding the validity of the transmitted text and numeric information;

means for identifying textual information entries in the data base as a potential failure mode type information;

means for identifying other information entries in the data base as other types of information, including: textural information as either:
- a description of a component or process step to which a potential failure mode applies;
- potential effect of a potential failure mode;
- potential cause of a potential failure mode;
- current control to prevent causes or effects of a potential failure mode; or
- recommended action to reduce the risk of the potential failure mode; and numeric information as either:
- an estimated frequency of occurrence of a potential failure mode;
- estimated severity of the effects of a potential failure mode;
- likelihood of detecting a failure mode;
- risk of a potential failure mode;
- estimated frequency of occurrence of a potential failure mode after taking the recommended action;
- estimated severity of the effects of a potential failure mode after taking the recommended action;
- likelihood of detecting a failure mode after taking the recommended action; or
- risk of a potential failure mode after taking the recommended action;

means for relating all the other entry types to a potential failure mode type entry in the data base; and means for generating signals and transmitting signals to the means for printing, for generating a report in which potential failure mode type entries are listed in at least one column identified for potential failure modes and the other entries are listed in other columns each of the other columns for one type of other entries and in which the report indicates which potential failure mode entry each other type of entry is related to.

6. A method for using a computer network, comprising the steps:

selecting members of a group;

providing a network of computer workstations with multiple computer input means at the workstations and one or more computer controlled displays;

in one or more group meetings in which the members have access to multiple workstations in a network, performing the steps:

simultaneously inputting failure modes for a product or process into computer input means, at a plurality of the workstations;

presenting the input failure modes on one or more computer controlled displays to multiple members of the group, at a plurality of the workstations;

reaching group agreement for validity of the failure modes;

inputting into computer input means to produce a list of validated failure modes;

reaching group agreement on validity and completeness of the list of failure modes;

reaching group agreement on the frequency of occurrence of failure modes;

inputting into computer input means the frequency of occurrence of failure modes;

simultaneously inputting effects of failure modes into the computer input means, at a plurality of the workstations;

presenting the input effects of failure modes on one or more computer controlled displays to multiple members of the group, at a plurality of the workstations;

reaching group agreement on validity of the effects of failure modes;

inputting into computer input means to produce a list of validated effects of failure modes;

reaching group agreement on severity of the effects;

inputting into computer input means the severity of the effects of failure modes;

simultaneously inputting causes of failure modes into the computer input means, at a plurality of the workstations;

presenting the input causes of failure modes on one or more computer controlled displays to multiple members of the group, at a plurality of the workstations;

reaching group agreement on validity of the causes of failure modes;

inputting into computer input means to produce a list of validated causes of failure modes;

reaching group agreement for validity of the causes and on the completeness of a list of valid causes of failure modes;

inputing into computer input means to store the failure modes, the frequency of occurrence of the failure modes, the effects of failure modes, the severity of the effects, and the causes of the failure modes, into a data base.

7. The method of claim 6 in which the frequency of occurrence of failure modes and the severity of the effects of failure modes is expressed quantitatively.

8. The method of claim 6 in which the risk of a plurality of failure modes is determined by the steps:

simultaneously inputting into input means the frequency of occurrence of the failure model at a plurality of workstations;

simultaneously inputting into input means a number for the severity of the effect of the failure model at a plurality of workstations;

simultaneously inputting into input means likelihood of detection of the failure model at a plurality of workstations;

reaching group agreement for the frequency of occurrence, the number for the severity of the effect, and the likelihood of detection of the failure mode;

inputting into computer input means to indicate the frequency of occurrence, number for the severity of the effect, and the likelihood of detection of the failure mode; and automatically generating a risk prioritization number by multiplying the frequency of occurrence, times the number for the severity of the effect, times the number for the likelihood of detection.

9. A method of claim 6, comprising the steps:

selecting members of a group;

providing in one room, a CPU for each member of the group, a CPU for a facilitator, and a CPU for a file server;

connecting the CPUs into a computer network;

connecting to each CPU, a keyboard and a mouse for inputting into the CPU from the respective member or facilitator and a screen for outputting from the CPU to the respective member or facilitator for providing a workstation for the respective member or facilitator;

connecting to the network, a group screen for outputting from the network at least 2000 characters simultaneously visible from each of the member workstations;

in a single defect identification and prioritization group meeting, performing the steps:

inputting into the facilitator workstation for prompting members of the group to input potential failure modes for an apparatus or process;

simultaneously inputting potential failure modes for an apparatus or process into a plurality of the member workstations;

anonymously outputting the potential failure modes to the group and the facilitator;

reaching group agreement for validity of each transmitted potential failure mode;

inputting into the facilitator workstation to compile a list of the validated potential failure modes;

displaying the list of validated potential failure modes to the members of the group;

reaching group agreement for completeness and validity of the list of failure modes;

inputting into the facilitator workstation for storing the list of validated failure modes in a data base;

inputting into the facilitator workstation for prompting members of the group to input frequency of occurrence of failure modes;

reaching group agreement for the frequency of occurrence of potential failure modes;

inputting into the facilitator workstation for storing the frequency of occurrence of failure modes in the data base;

inputting into the facilitator workstation for prompting members of the group to input potential effects of a failure mode;

simultaneously inputting potential effects of the failure mode into a plurality of the member workstations;

anonymously outputting the transmitted potential effects to the facilitator and members;

reaching group agreement for the completeness and validity of the list of potential effects of the failure mode;

reaching group agreement for a quantitative representation of relative severity of the potential failure mode;

reaching group agreement for a quantitative representation of the likelihood of detection preventing the potential failure mode;

generating a risk prioritization number by multiplying the frequency of occurrence times the number for the severity of the effect times the likelihood of detection;

inputting into the facilitator workstation for storing the potential effects, the relative severity, the likelihood of detection, and the risk prioritization number into the data base;

inputting into the facilitator keyboard to produce an FMEA report;

retrieving and reorganizing the potential failure modes, components or process steps to which the potential failure modes apply, the effects of the failure modes, the estimated frequency of occurrence of the failure mode, the estimated severity of the effects, the likelihood of detection and the risk prioritization number, into a predetermined arrangement of multiple columns separated by vertical lines and having descriptive headers at the top of each column;

printing the predetermined arrangement as a draft FMEA report;

distributing a copy of the report to each member;

reaching group agreement on required changes to the report;

inputting into the facilitator workstation for storing the changes in the data base;

again retrieving and reorganizing the potential failure modes, components or process steps to which the potential failure modes apply, the effects of the failure modes, the estimated frequency of occurrence of the failure mode, the estimated severity of the effects, the likelihood of detection and the risk prioritization number, into a predetermined arrangement of multiple columns separated by vertical lines and having descriptive headers at the top of each column;

reprinting the arrangement as an FMEA report;

reaching group agreement that the report is correct;
in a subsequent plurality of defect analysis group meetings each for one or more failure modes, performing the steps:
  inputting into the facilitator workstation for prompting members of the group to input potential causes of the failure mode;
  simultaneously inputting potential causes of the failure mode into a plurality of the member workstations and transmitting the input;
  anonymously outputting the transmitted potential causes to the facilitator and members;
  reaching group agreement for the completeness and validity of the potential causes of the failure mode;
  inputting into the facilitator workstation for storing the potential causes of the failure mode in the data base;
  inputting into the facilitator workstation for prompting members of the group to input current controls for preventing a failure mode;
  simultaneously inputting current controls for the failure mode into a plurality of the member workstations and transmitting the input;
  anonymously outputting the transmitted current controls to the facilitator and members;
  reaching group agreement for the completeness and validity of the list of current controls for the failure mode;
  inputting into the facilitator workstation for storing the current controls for the failure mode in the data base;
  inputting into the facilitator workstation for prompting members of the group to input recommended actions for reducing the risk prioritization number of a failure mode;
  simultaneously inputting recommended actions of the failure mode into a plurality of the member workstations and transmitting the input;
  anonymously outputting the transmitted recommended actions to the facilitator and members;
  reaching group agreement for the completeness and validity of the list of recommended actions for the failure mode;
  inputting into the facilitator workstation for storing the recommended actions for the failure mode in the data base;
  retrieving and reorganizing the potential failure modes, components or process steps to which the potential failure modes apply, the effects of the failure modes, the estimated frequency of occurrence of the failure mode, the estimated severity of the effects, the likelihood of detection, the risk prioritization number, the causes of the failure mode, the current controls to prevent the failure mode, and the recommended action to reduce the risk prioritization number, into a predetermined arrangement of multiple columns separated by vertical lines and having descriptive headers at the top of each column;
  printing the arrangement as a draft FMEA report;
  distributing a copy of the report to each member;
  reaching group agreement on corrections which need to be made in the report;
  inputting into the facilitator workstation for correcting the data base;
  again retrieving and reorganizing the potential failure modes, components or process steps to which the potential failure modes apply, the effects of the failure modes, the estimated frequency of occurrence of the failure mode, the estimated severity of the effects, the likelihood of detection, the risk prioritization number, the causes of the failure mode, the current controls to prevent the failure mode, and the recommended action to reduce the risk prioritization number, into a predetermined arrangement of multiple columns separated by vertical lines and having descriptive headers at the top of each column;
  reprinting the arrangement as an FMEA report;
  reaching group agreement that the report is correct;
in at least one subsequent group meetings, performing the steps:
  inputting into the facilitator workstation for prompting members of the group to input actions taken to reduce risk priority number of a failure mode;
  simultaneously inputting actions taken for the failure mode into a plurality of the member workstations and transmitting the input;
  anonymously outputting the transmitted actions taken to the facilitator and members;
  reaching group agreement for the completeness and validity of the list of actions taken for the failure mode;
  inputting into the facilitator workstation for storing the list of actions into the data base;
  reaching group agreement for the frequency of occurrence of the potential failure mode after taking the actions;
  reaching group agreement for a quantitative representation of the relative severity of the potential failure mode after taking the actions;
  reaching group agreement for a quantitative representation of the likelihood of detection preventing the potential failure mode after taking the actions;
  generating a risk prioritization number after taking the actions by multiplying the frequency of occurrence after taking the actions, times the number for the severity of the effect after taking the actions, times the likelihood of detection after taking the actions;
  inputting into the facilitator workstation for storing the frequency of occurrence after taking the actions, the relative severity after taking the actions, the likelihood of detection after taking the actions, and the risk prioritization number after taking the actions into the data base;
  inputting into the facilitator keyboard to produce an FMEA report;
  retrieving and reorganizing the potential failure modes, components or process steps to which the potential failure modes apply, the effects of the failure modes, the estimated frequency of occurrence of the failure mode, the estimated severity of the effects, the likelihood of detection, the risk prioritization number, the causes of the failure mode, the current controls to prevent the failure mode, the recommended actions to reduce the risk prioritization number, the actions taken, the frequency of occurrence after taking the actions, the relative severity of the effects after taking the actions, the likelihood of detection after taking the actions, and the risk priority number after taking the actions, into a predetermined arrangement of multiple columns separated by vertical lines and having descriptive headers at the top of each column;
  printing the arrangement as a draft FMEA report;
  distributing a copy of the report to each member;
  reaching group agreement on required changes to the report;

inputting into the facilitator workstation for storing the changes in the data base;

again retrieving and reorganizing the potential failure modes, components or process steps to which the potential failure modes apply, the effects of the failure modes, the estimated frequency of occurrence of the failure mode, the estimated severity of the effects, the likelihood of detection, the risk prioritization number, the causes of the failure mode, the current controls to prevent the failure mode, the recommended actions to reduce the risk prioritization number, the actions taken, the frequency of occurrence after taking the actions, the relative severity of the effects after taking the actions, the likelihood of detection after taking the actions, and the risk priority number after taking the actions, into a predetermined arrangement of multiple columns separated by vertical lines and having descriptive headers at the top of each column;

reprinting the arrangement as an FMEA report;

reaching group agreement that the report is correct; and in which:

one or more steps of reaching group agreement includes, the steps:
inputting into the facilitator workstation for prompting the members to vote;
inputting into the member workstations to vote; and
and automatically tabulating the votes and displaying results of the vote to the members and facilitator;

one or more of the steps of anonymously displaying to the group includes the steps:
anonymously displaying the transmitted input on the group display; and
anonymously displaying the input transmitted from the member workstations on one or more displays of other member workstations;

one or more of the steps of inputting and transmitting input includes the steps:
inputting to enter information;
inputting to edit the information; and
inputting to transmit the edited information.

10. A computer data base system, comprising:

system means for storing and retrieving failure mode type textual entries;

system means for storing and retrieving cause type textual entries and a relation between each and a failure mode type entry;

system means for storing and retrieving effect type textual entries and a relation between each and a failure mode type entry;

system means for storing and retrieving frequency of occurrence type numerical entries and a relation between each and a failure mode type entry;

system means for storing and retrieving severity type numerical entries and a relation between each and a failure mode type entry; and system means for storing and retrieving recommended action to reduce the risk of failure mode type textual entire and a relation between each and a failure mode type entry.

11. The system of claim 10 further comprising:

system means for storing and retrieving frequency of occurrence after taking the action_type numerical entries and a relation between each and a failure mode type entry;

system means for storing and retrieving estimated severity after taking the action type numerical entries and a relation between each and a failure mode type entry;

system means for storing and retrieving likelihood of detecting after taking the action type numerical entries and a relation between each and a failure mode type entry;

system means for storing and retrieving risk prioritization after taking the action type numerical entries and a relation between each and a failure mode type entry.

12. The system of claim 10, comprising:

stored data signals in which groups of textual and numerical entries are stored sequentially with the same predetermined order of entries in each group, and the entries including:
a potential failure mode textual entry;
a potential effect of the potential failure mode textual entry;
an estimated frequency of occurrence of the potential failure mode numerical entry; and
an estimated severity of the effects of the potential failure mode numerical entry.

13. The system of claim 12, in which the entries in each group further include:

likelihood of detecting a failure mode numerical entry;

risk prioritization of a potential failure mode numerical entry;

current control to prevent the causes or effects of a potential failure mode textual entry;

recommended action to reduce the risk of the potential failure mode textual entry;

estimated frequency of occurrence of a potential failure mode after taking the recommended action numerical entry;

estimated severity of the effects of a potential failure mode after taking the recommended action numerical entry;

likelihood of detecting a failure mode after taking the recommended action numerical entry; and risk prioritization of a potential failure mode after taking the recommended action numerical entry.

14. A method of operating a computer data base system, comprising the steps:

storing and retrieving failure mode type textual entries;

storing and retrieving cause type textual entries and a relation between each and a failure mode type entry;

storing and retrieving effect type textual entries and a relation between each and a failure mode type entry;

storing and retrieving frequency of occurrence type numerical entries and a relation between each and a failure mode type entry;

storing and retrieving severity type numerical entries and a relation between each and a failure mode type entry; and storing and retrieving recommended action to reduce the risk type textual entries and a relation between each and a failure mode type entry.

15. The method of claim 14 further comprising:

storing and retrieving frequency of occurrence after taking the action type numerical entries and a relation between each and a failure mode type entry;

storing and retrieving estimated severity after taking the action type numerical entries and a relation between each and a failure mode type entry;

storing and retrieving likelihood of detecting after taking the action type numerical entries and a relation between each and a failure mode type entry; and storing and retrieving risk prioritization after taking the action type numerical entries and a relation between each and a failure mode type entry.

16. A computer system for producing an FMEA (failure mode and effects analysis) report, comprising:

system means for communicating with a computer data base system for receiving stored data base signals for FMEA analysis;

system means for organizing the data base signals received from the data base into signals for a predetermined arrangement of multiple columns, including:

system means for organizing data base signals for a description of parts or steps being analyzed into at least one of the columns;

system means for organizing data base signals for potential failure mode text into at least one of the columns;

system means for organizing data base signals for potential effects of failure modes text into at least one of the columns;

system means for organizing data base signals for potential causes of failure modes text into at least one of the columns;

system means for organizing data base signals for estimated frequencies of occurrence of failure modes numbers into at least one of the columns;

system means for organizing data base signals for estimated severity of the effects of potential failure modes numbers into at least one of the columns; and system means for organizing data base signals for recommended action to reduce the risk of the potential failure mode text into at least one of the columns; and system means for transmitting the arrangement of signals to a printer to produce columnar FMEA report forms.

17. The computer system of claim 16 in which system means for organizing data signals received from the data base into a predetermined arrangement of columns, further include:

system means for organizing data base signals for estimated frequency of occurrence of a potential failure mode after taking the recommended action numbers into at least one of the columns;

system means for organizing data base signals for estimated severity of the effects of a potential failure mode after taking the recommended action numbers into at least one of the columns;

system means for organizing data base signals for likelihood of detecting a failure mode after taking the recommended action numbers into at least one of the columns; and system means for organizing data base signals for risk prioritization of a potential failure mode after taking the recommended action numbers into at least one of the columns.

18. A method of operating a computer system, comprising the steps:

communicating with a computer data base system for receiving stored data base signals for FMEA analysis;

organizing the data base signals received from the data base into a predetermined arrangement of multiple columns, including the steps:

organizing data base signals for a description of parts or steps being analyzed into at least one of the columns;

organizing data base signals for potential failure mode text into at least one of the columns;

organizing data base signals for potential effects of failure modes text into at least one of the columns;

organizing data base signals for potential causes of failure modes text into at least one of the columns;

organizing data base signals for estimated frequencies of occurrence of failure modes numbers into at least one of the columns;

organizing data base signals for estimated severity of the effects of potential failure modes numbers into at least one of the columns; and organizing data base signals for recommended action to reduce the risk of the potential failure mode test into at least one of the columns; and transmitting data to a printer to produce columnar FMEA report forms.

19. The method of claim 18 in which organizing data base signals received from the data base into a predetermined arrangement of columns, further includes the steps:

organizing data base signals for estimated frequency of occurrence of a potential failure mode after taking the recommended action numbers into at least one of the columns;

organizing data base signals for estimated severity of the effects of a potential failure mode after taking the recommended action numbers into at least one of the columns;

organizing data base signals for likelihood of detecting a failure mode after taking the recommended action numbers into at least one of the columns; and organizing data base signals for risk of a potential failure mode after taking the recommended action numbers into at least one of the columns.

20. A computer data base system, comprising: system means for storing and retrieving failure mode type textual entries;

systems means for storing and retrieving cause type textual entries and a relation between each and a failure mode type entry;

system means for storing and retrieving effect type textual entries and a relation between each and a failure mode type entry;

system means for storing and retrieving frequency of occurrence type numerical entries and a relation between each and a failure mode type entry;

system means for storing and retrieving severity type numerical entries and a relation between each and a failure mode type entry; and system means for storing and retrieving likelihood of detecting type numerical entries and a relation between each and a failure mode type entry.

21. A computer data base system, comprising:

system means for storing and retrieving failure mode type textual entries;

system means for storing and retrieving cause type textual entries and a relation between each and a failure mode type entry;

system means for storing and retrieving effect type textual entries and a relation between each and a failure mode type entry;

system means for storing and retrieving frequency of occurrence type numerical entries and a relation between each and a failure mode type entry;

system means for storing and retrieving severity type numerical entries and a relation between each and a failure mode type entry; and system means for storing and retrieving risk type numerical entries and a relation between each and a failure mode type entry.

22. A computer data base system, comprising:

system means for storing and retrieving failure mode type textual entries;

system means for storing and retrieving cause type textual entries and a relation between each and a failure mode type entry;

system means for storing and retrieving effect type textual entries and a relation between each and a failure mode type entry;

system means for storing and retrieving frequency of occurrence type numerical entries and a relation between each and a failure mode type entry;

system means for storing and retrieving severity type numerical entries and a relation between each and a failure mode type entry; and system means for storing and retrieving current controls type textual entries and a relation between each and a failure mode type entry.

23. A method of operating a computer data base system, comprising the steps:

storing and retrieving failure mode type textual entries;

storing and retrieving cause type textual entries and a relation between each and a failure mode type entry;

storing and retrieving effect type textual entries and a relation between each and a failure mode type entry;

storing and retrieving frequency of occurrence type numerical entries and a relation between each and a failure mode type entry;

storing and retrieving severity type numerical entries and a relation between each and a failure mode type entry; and storing and retrieving likelihood of detecting type numerical entries and a relation between each and a failure mode type entry.

24. A method of operating a computer data base system, comprising the steps:

storing and retrieving failure mode type textual entries;

storing and retrieving cause type textual entries and a relation between each and a failure mode type entry;

storing and retrieving effect type textual entries an da relation between each and a failure mode type entry;

storing and retrieving frequency of occurrence type numerical entries and a relation between each and a failure mode type entry;

storing and retrieving severity type numerical entries and a relation between each and a failure mode type entry; and storing and retrieving risk prioritization type numerical entries and a relation between each and a failure mode type entry.

25. A method of operating a computer data base system, comprising the steps:

storing and retrieving failure mode type textual entries;

storing and retrieving cause type textual entries and a relation between each and a failure mode type entry;

storing and retrieving effect type textual entries and a relation between each and a failure mode type entry;

storing and retrieving frequency of occurrence type numerical entries and a relation between each and a failure mode type entry;

storing and retrieving severity type numerical entries and a relation between each and a failure mode type entry; and storing and retrieving current controls type textual entries and a relation between each and a failure mode type entry.

26. A computer system for producing an FMEA report, comprising:

system means for communicating with a computer data base system for receiving stored data signals for FMEA analysis;

system means for organizing the data signals received from the data base into signals for a predetermined arrangement of multiple columns, including:

system means for organizing signals for a description of parts or steps being analyzed into at least one of the columns;

system means for organizing signals for potential failure mode text into at least one of the columns;

system means for organizing signals for potential effects of failure modes text into at least one of the columns;

system means for organizing signals for potential causes of failure modes text into at least one of the columns;

systems means for organizing signals for estimated frequencies of occurrence of failure modes numbers into at least one of the columns;

system means for organizing signals for estimated severity of the effects of potential failure modes numbers into at least one of the columns; and system means for organizing signals for likelihood of detecting a failure mode numbers into at least one of the columns; and system means for transmitting the arrangement of signals to a printer to produce columnar FMEA report forms.

27. A computer system for producing an FMEA report, comprising:

system means for communicating with a computer data base system for receiving stored data signals for FMEA analysis;

system means for organizing the data signals received from the data base into signals for a predetermined arrangement of multiple columns, including:

system means for organizing signals for a description of parts or steps being analyzed into at least one of the columns;

system means for organizing signals for potential failure mode text into at least one of the columns;

system means for organizing signals for potential effects of failure modes text into at least one of the columns;

system means for organizing signals for potential causes of failure modes text into at least one of the columns;

system means for organizing signals for estimated frequencies of occurrence of failure modes numbers into at least one of the columns;

system means for organizing signals for estimated severity of the effects of potential failure modes numbers into at least one of the columns;

system means for organizing signals for risk of a potential failure mode numbers into at least one of the columns; and system means for transmitting the arrangement of signals to a printer to produce columnar FMEA report forms.

28. A computer system for producing an FMEA report, comprising:

system means for communicating with a computer data base system for receiving stored data signals for FMEA analysis;

system means for organizing the data signals received from the data base into signals for a predetermined arrangement of multiple columns, including:

system means for organizing signals for a description of parts or steps being analyzed into at least one of the columns;

system means for organizing signals for potential failure mode text into at least one of the columns;

system means for organizing signals for potential effects of failure modes text into at least one of the columns;

system means for organizing signals for potential causes of failure modes text into at least one of the columns;

system means for organizing signals for estimated frequencies of occurrence of failure modes number into at least one of the columns;

system means for organizing signals for estimated severity of the effects of potential failure modes numbers into at least one of the columns; and system means for organizing signals for current control to prevent the causes or effects of a potential failure mode text into at least one of the columns; and system means for transmitting the arrangement of signals to a printer to produce columnar FMEA report forms.

29. A method of operating a computer system, comprising the steps:

communicating with a computer data base system for receiving stored data signals for FMEA analysis;

organizing the data signals received from the data base into a predetermined arrangement of multiple columns, including the steps:

organizing signals for a description of parts or steps being analyzed into at least one of the columns;

organizing signals for potential failure mode text into at least one of the columns;

organizing signals for potential effects of failure modes text into at least one of the columns;

organizing signals for potential causes of failure modes text into at least one of the columns;

organizing signals for estimated frequencies of occurrence of failure modes numbers into at least one of the columns;

organizing signals for estimated severity of the effects of potential failure modes numbers into at least one of the columns;

organizing signals for likelihood of detecting a failure mode numbers into at least one of the columns; and organizing signals for likelihood of detecting a failure mode numbers into at least one of the columns; and transmitting data to a printer to produce columnar FMEA report forms.

30. A method of operating a computer system, comprising the steps:

communicating with a computer data base system for receiving stored data signals for FMEA analysis;

organizing the data signals received from the data base into a predetermined arrangement of multiple columns, including the steps:

organizing signals for a description of parts or steps being analyzed into at least one of the columns;

organizing signals for potential failure mode text into at least one of the columns;

organizing signals for potential effects of failure modes text into at least one of the columns;

organizing signals for estimated frequencies of occurrence of failure modes numbers into at least one of the columns;

organizing signals for estimated severity of the effects of potential failure modes numbers into at least one of the columns; and organizing signals for risk of a potential failure mode numbers into at least one of the columns; and transmitting data to a printer to produce columnar FMEA report forms.

31. A method of operating a computer system, comprising the steps:

communicating with a computer data base system for receiving stored data signals for FMEA analysis;

organizing the data signals received from the data base into a predetermined arrangement of multiple columns, including the steps:

organizing signals for a description of parts or steps being analyzed into at least one of the columns;

organizing signals for potential failure mode text into at least one of the columns;

organizing signals for potential effects of failure modes text into at least one of the columns;

organizing signals for potential causes of failure modes text into at least one of the columns;

organizing signals for estimated frequencies of occurrence of failure modes numbers into at least one of the columns;

organizing signals for estimated severity of the effects of potential failure modes numbers into at least one of the columns; and organizing signals for current control to prevent the causes or effects of a potential failure mode text into at least one of the columns; and transmitting data to a printer to produce columnar FMEA report forms.

* * * * *